United States Patent
Mano

(10) Patent No.: US 8,948,383 B2
(45) Date of Patent: Feb. 3, 2015

(54) PRINTING SYSTEM, PRINTING METHOD, TERMINAL, AND COMPUTER-READABLE STORAGE MEDIUM FOR COMPUTER PROGRAM

(75) Inventor: Jun Mano, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 84 days.

(21) Appl. No.: 13/400,145

(22) Filed: Feb. 20, 2012

(65) Prior Publication Data

US 2012/0219151 A1    Aug. 30, 2012

(30) Foreign Application Priority Data

Feb. 25, 2011    (JP) .................................. 2011-039265

(51) Int. Cl.
| | |
|---|---|
| G09C 3/08 | (2006.01) |
| G06F 3/12 | (2006.01) |
| G06F 21/00 | (2013.01) |
| G06K 15/00 | (2006.01) |

(52) U.S. Cl.
CPC ............... *G06F 3/12* (2013.01); *G06F 3/1222* (2013.01); *G06F 3/1238* (2013.01); *G06F 3/1267* (2013.01); *G06F 3/1288* (2013.01); *G06F 21/00* (2013.01); *G06K 15/4095* (2013.01)
USPC .......................................................... 380/51

(58) Field of Classification Search
USPC .......................................................... 380/51
See application file for complete search history.

(56) References Cited

U.S. PATENT DOCUMENTS

2003/0197887 A1*  10/2003  Shenoy et al. ............... 358/1.15
2005/0084113 A1*  4/2005  Simpson et al. ............. 380/270
(Continued)

FOREIGN PATENT DOCUMENTS

| CN | 1959695 | 5/2007 |
|---|---|---|
| CN | 101872402 | 10/2010 |

(Continued)

OTHER PUBLICATIONS

Office Action (Notification of Reason(s) for Refusal) issued on Apr. 23, 2013, by the Japanese Patent Office in corresponding Japanese Patent Application No. 2011-039265, and an English Translation of the Office Action. (7 pages).

(Continued)

*Primary Examiner* — Esther Benoit

(74) *Attorney, Agent, or Firm* — Buchanan Ingersoll & Rooney PC

(57) ABSTRACT

A printing system is provided with a terminal sending print data; a printer performing printing based on the print data; and a transfer device transferring the print data to the printer responding to a request from the printer. The terminal includes a transmission portion configured to, when communication with the transfer device is possible, send the print data to the transfer device, and configured to, when the communication is impossible, send the print data in association with a command for authentication print to the printer without via the transfer device. The printer includes a requesting portion configured to, when user authentication of a user of the terminal is successful, request the print data from the transfer device, and a printing portion configured to, when the user authentication is successful, perform the printing based on the print data received from the transfer device or the terminal.

6 Claims, 23 Drawing Sheets

(56) References Cited

U.S. PATENT DOCUMENTS

2007/0103715 A1    5/2007    Nakata
2011/0090535 A1*    4/2011    Towata .................. 358/1.15

FOREIGN PATENT DOCUMENTS

| | | |
|---|---|---|
| JP | 2001-56756 A | 2/2001 |
| JP | 2004-310516 A | 11/2004 |
| JP | 2005-318108 A | 11/2005 |
| JP | 2008-055632 A | 3/2008 |
| JP | 2010-170451 A | 8/2010 |

OTHER PUBLICATIONS

Office Action issued on Jun. 23, 2014 in corresponding application, CN 201210041909.2.

* cited by examiner

SYSP

FIG. 11

ETB

| MODEL ID (etb1) | ENCRYPTION KEY (etb2) |
|---|---|
| C101 | XXX1 |
| C102 | XXX2 |
| C103 | XXX3 |
| C201 | YYY1 |
| C202 | YYY2 |
| C301 | ZZZ1 |
| ⋮ | ⋮ |

PRINTING SYSTEM, PRINTING METHOD, TERMINAL, AND COMPUTER-READABLE STORAGE MEDIUM FOR COMPUTER PROGRAM

This application is based on Japanese patent application No. 2011-039265 filed on Feb. 25, 2011, the contents of which are hereby incorporated by reference.

BACKGROUND OF THE INVENTION

1. Field of the Invention

The present invention relates to a printing system configured of a print-requesting device, a printing device, and a transfer device through which communication is performed between the print-requesting device and the printing device, and so on.

2. Description of the Related Art

FIG. 1 is a diagram showing an example of a conventional pull printing system SYSP.

A printing device has recently attained widespread use for printing the result of processing by a personal computer, and the like onto a recording medium such as paper.

Such a printing device is called, for example, a "printer", and is connected to a computer via a network such as a dedicated cable or a LAN. A printing device connectable via a network is called a "network printer" or the like.

A printing device having a variety of functions, such as copying, scanning, faxing, and a document server function, in addition to a printing function, is called, for example, a "multifunction device", "Multi-Functional Peripheral (MFP)".

The printing system SYSP as shown in FIG. 1 is an example of a printing system using a network printer. The printing system SYSP is so configured that a (pull) print server 2P temporarily saves (spools) print data on a print target, and print data which is sent from a personal computer 1P and the like and saved in the print server 2P is sent out to a network printer 3P appropriately. Such a printing system is called a "pull printing system", for example.

In such a pull printing system, where a plurality of printing devices are connected to a print server via a network, a user can obtain print data saved in the print server and give a command to perform printing based on the print data by using whichever printing device the user selects. Further, in the pull printing system, it is possible to temporarily save, in the print server, print data of a user who needs to be verified before printing, print data on a print target which does not need to be printed immediately, and other print data. In this way, the print server of the pull printing system serves to transfer print data from a personal computer or the like to a printing device and vice versa (see Japanese Laid-open Patent Publication No. 2001-056756).

In addition, providing an authentication server in a system is proposed (see Japanese Laid-open Patent Publication No. 2010-170451).

As described above, such a pull printing system configuration makes a printing device convenient to use, and improves the security level of a printing device.

In the pull printing system, however, if a print server becomes unavailable, a user cannot cause a printing device to perform printing via the print server until the print server recovers from the unavailable state and is ready to be used.

In such a case, the user can output print data directly to the printing device without via the print server and cause the printing device to perform printing. In order to do this, however, a printer driver compatible with the printing device as the output destination needs to be installed on a personal computer to be used by the user, and so on. Otherwise, the user has to perform a cumbersome task for installing such a printer driver into the personal computer and so on. Even if such a printer driver is installed therein in advance, the user has to make annoying settings for printing. Further, when print data is directly outputted to the printing device, the security level required to use the printing device may not be maintained.

SUMMARY

The present disclosure is directed to solve the problems pointed out above, and therefore, an object of an embodiment of the present invention is to enable printing in a secure manner even when a print server of a pull printing system is unavailable.

A printing system according to one aspect of the present invention is a printing system including a terminal for sending print data; a printer for performing printing based on the print data; and a transfer device for transferring the print data to the printer in response to a request from the printer. The terminal includes a transmission portion configured to, when communication with the transfer device is possible, send the print data to the transfer device, and configured to, when the communication is impossible, send the print data in association with a command to perform authentication print to the printer without via the transfer device. The printer includes a requesting portion configured to, when user authentication of a user of the terminal is successful, request the print data from the transfer device, and a printing portion configured to, when the user authentication is successful, perform the printing based on the print data received from any one of the transfer device and the terminal.

Preferably, the printer is given a decryption key, the transmission portion of the terminal sends the print data in association with an encrypted password obtained as a result of encryption, using an encryption key corresponding to the decryption key, of a first password entered by the user, the printer includes a decryption portion configured to decrypt the encrypted password by using the decryption key of the subject printer to obtain the first password, and the printing portion of the printer performs the printing if the first password obtained matches a second password entered into the subject printer.

Preferably, the printer is at least two printers, the decryption key is given on a printer-by-printer basis, the transfer device includes a transmission portion configured to encrypt the first password by using the encryption key corresponding to a printer, which is a request source, of the printers, and to send the first password encrypted to the printer as the request source.

These and other characteristics and objects of the present invention will become more apparent by the following descriptions of preferred embodiments with reference to drawings.

BRIEF DESCRIPTION OF THE DRAWINGS

FIG. 11 is a diagram showing an example of an encryption key table.

DESCRIPTION OF THE PREFERRED EMBODIMENTS

[First Embodiment]

Figure 1:
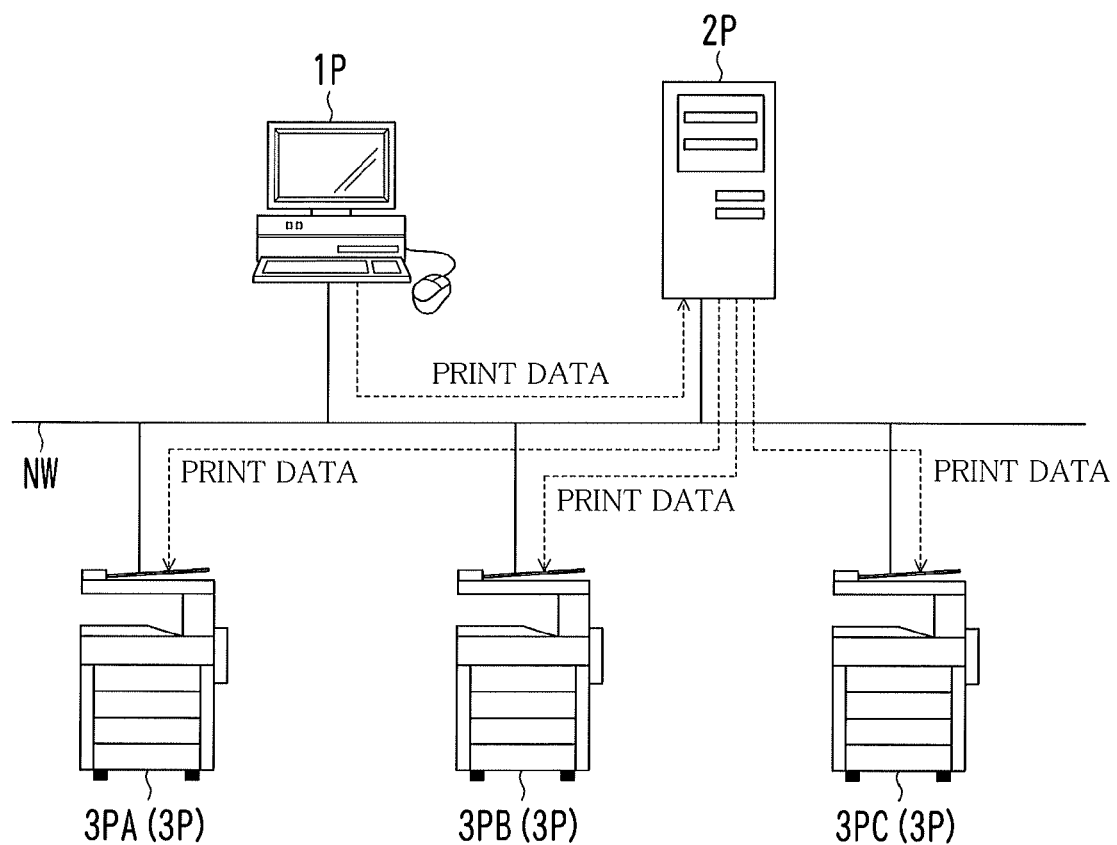
FIG. 1 is a diagram showing an example of a conventional pull printing system.
Figure 2:
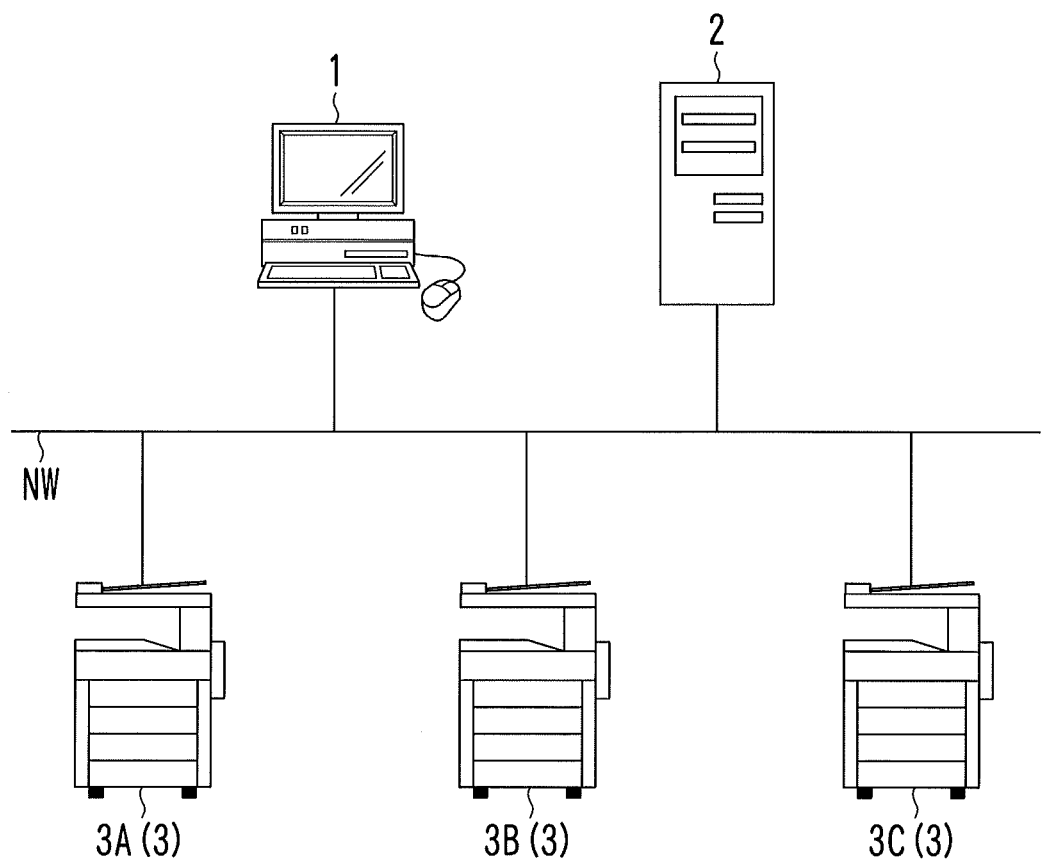
FIG. 2 is a diagram showing an example of a printing system according to a first embodiment.
Figure 3:
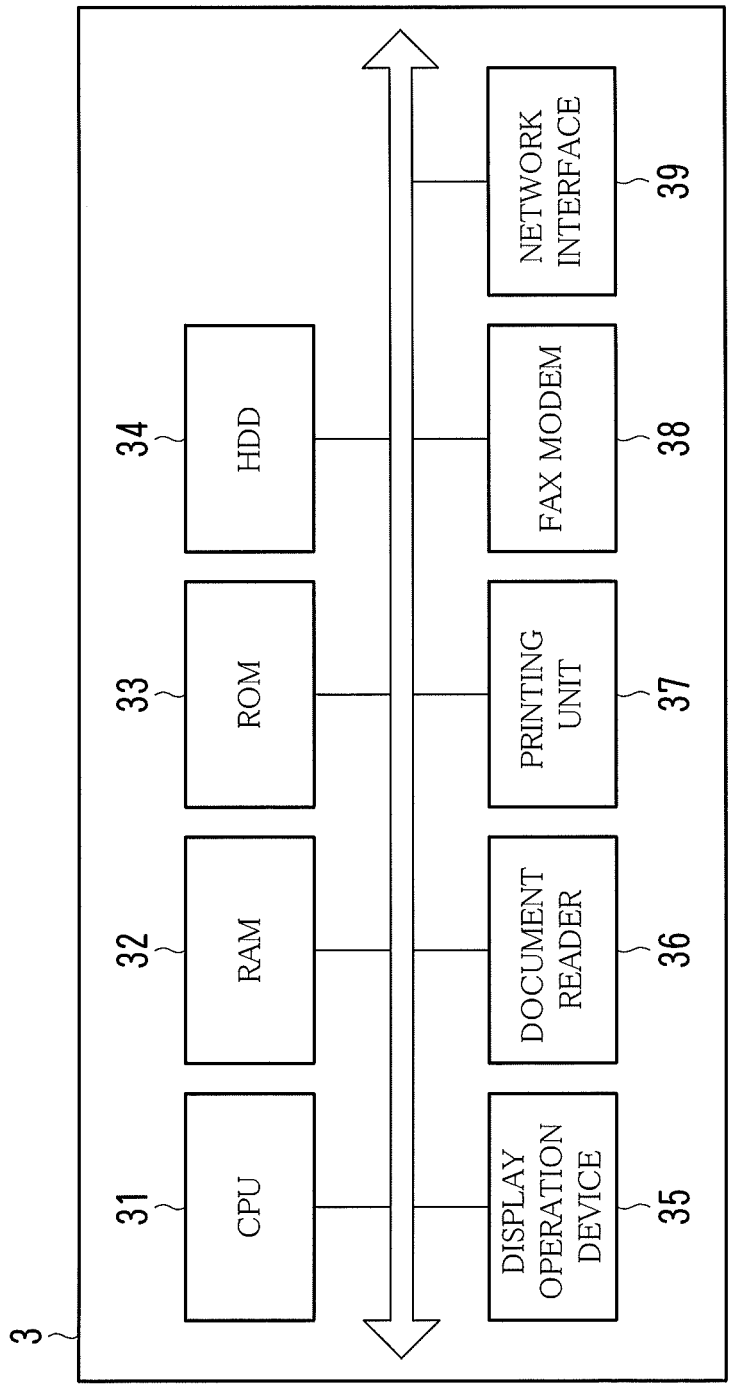
FIG. 3 is a diagram showing an example of the hardware configuration of a printer.

FIG. 2 is a diagram showing an example of a printing system SYS1 according to the first embodiment, and FIG. 3 is a diagram showing an example of the hardware configuration of a printer 3.

As shown in FIG. 2, the printing system SYS1 is configured of a print-requesting device (terminal) 1, a print server 2 and printers 3 (3A-3C) all of which are connected to one another via a network NW.

The print-requesting device 1 is a device for a user to create a document file by using document creation software, and to request the printer 3, directly or through the print server 2, to print the contents of the created document file. The print-requesting device 1 is, for example, a personal computer.

The print server 2 is operable to receive print data on a print target from the print-requesting device 1, to save (spool) the received print data temporarily, and to send the print data thus saved to the printer 3 in response to a request from the printer 3. In short, the print server 2 is a pull printing server.

The printer 3 is operable to receive print data that is a print target from the print-requesting device 1 directly or through the print server 2, and to print an image contained in the received print data onto paper, or the like. In the illustrated example of FIG. 2, the printer 3 is a "multifunction device" or a "Multi-Functional Peripheral (MFP)" which has a variety of functions, such as copying, scanning, faxing, and a document server function in addition to the network function and the printing function. Such a device serving as the printer 3 needs at least the network function and the printing function.

The network NW is a communication line for enabling communication between information processing devices connected thereto, namely, is a so-called Local Area Network (LAN).

Referring to FIG. 3, the printer 3 is configured of a Central Processing Unit (CPU) 31, a Random Access Memory (RAM) 32, a Read Only Memory (ROM) 33, a Hard Disk Drive (HDD) 34, a display operation device 35, a document reader 36, a printing unit 37, a FAX modem 38, a network interface 39, and so on. Since the minimum required functions of the printer 3 are the network function and the printing function as described above, the document reader 36, the FAX modem 38, and so on are not essential elements of the printer 3.

The CPU 31 provides a centralized control of the printer 3 by using the RAM 32 as a work area to perform operation based on programs and data stored in the ROM 33 or the HDD 34, and on various data sets inputted through the network interface 39.

The HDD 34 is a non-volatile storage device for retaining data stored therein even when no power is supplied. Instead of the HDD 34, a semiconductor memory such as a Solid State Drive (SSD) and a flash memory may be used.

The printer 3 is equipped with a function for a so-called file management system. A user who is an administrator of the printer 3 can use this function to create, in the HDD 34, a logical storage location called a "BOX" for file classification and file management. For example, the administrator user can create boxes on a user-by-user basis for users of the printer 3. At this time, the administrator user can create such boxes in a hierarchical format. The administrator user can also restrict access by users to each box. Stated differently, a box corresponds to a folder or a directory provided in an Operating System (OS) for a personal computer.

The display operation device 35 is provided with, for example, a touch-sensitive panel display and various kinds of operation switches. The display operation device 35 is operable to display many screens for a user, and to accept various operation performed by the user.

The document reader 36 is provided with a light source, an image sensor, and so on. The document reader 36 is a device that optically captures an image such as a character, chart, and symbol depicted on paper to create image data thereof.

The printing unit 37 is configured of a printer controller, a printer engine, and so on. The printer controller is operable to interpret print data that is received via the network interface 39 and is described in a printer language (PDL: Page Description Language), and to generate image data serving as a print target. The printer engine is implemented by using an electrophotographic print mechanism, an inkjet print mechanism, or a thermal transfer print mechanism. The printer engine serves to print a monochrome image or a color image onto paper based on image data generated by the print controller, or image data created by the document reader 36.

The FAX modem 38 serves to send and receive data with other FAX machines via a public line. For sending and receiving data, a FAX protocol such as G3 is used.

The network interface 39 serves to send and receive data with other information processing devices via a network such as the LAN. A communication protocol, e.g., Transmission Control Protocol/Internet Protocol (TCP/IP) is used for sending and receiving data.

Each of the print-requesting device 1 and the print server 2 is provided with a CPU, a RAM, a ROM, a non-volatile auxiliary storage device such as an HDD, and a network interface for sending and receiving data with other information processing devices via a network such as a LAN. Besides, the print-requesting device 1 is also provided with a display device, an inputting device such as a keyboard and a pointing device, and so on.

Figure 4:
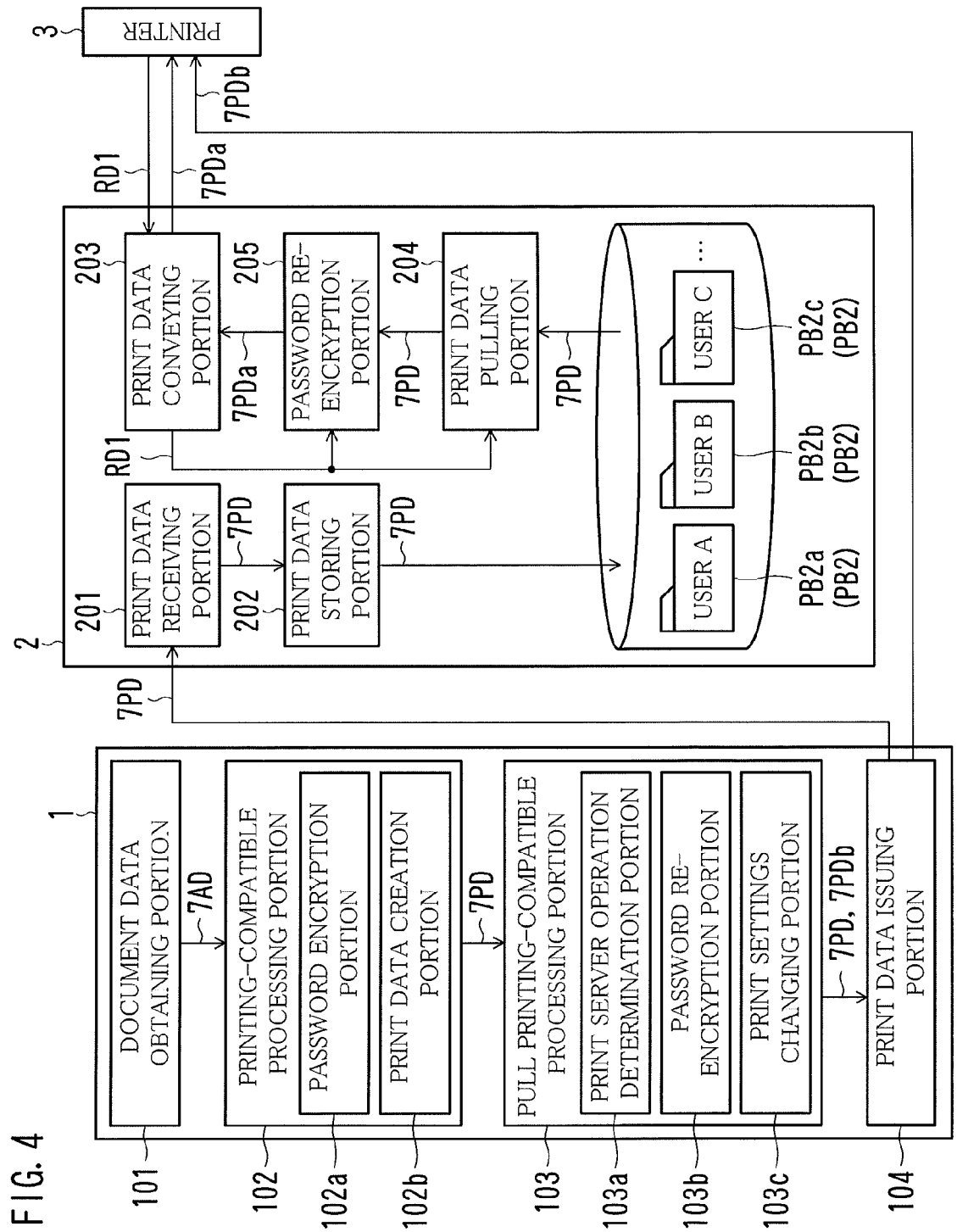
FIG. 4 is a diagram showing an example of a partial functional configuration of a print-requesting device and a print server.
Figure 5:
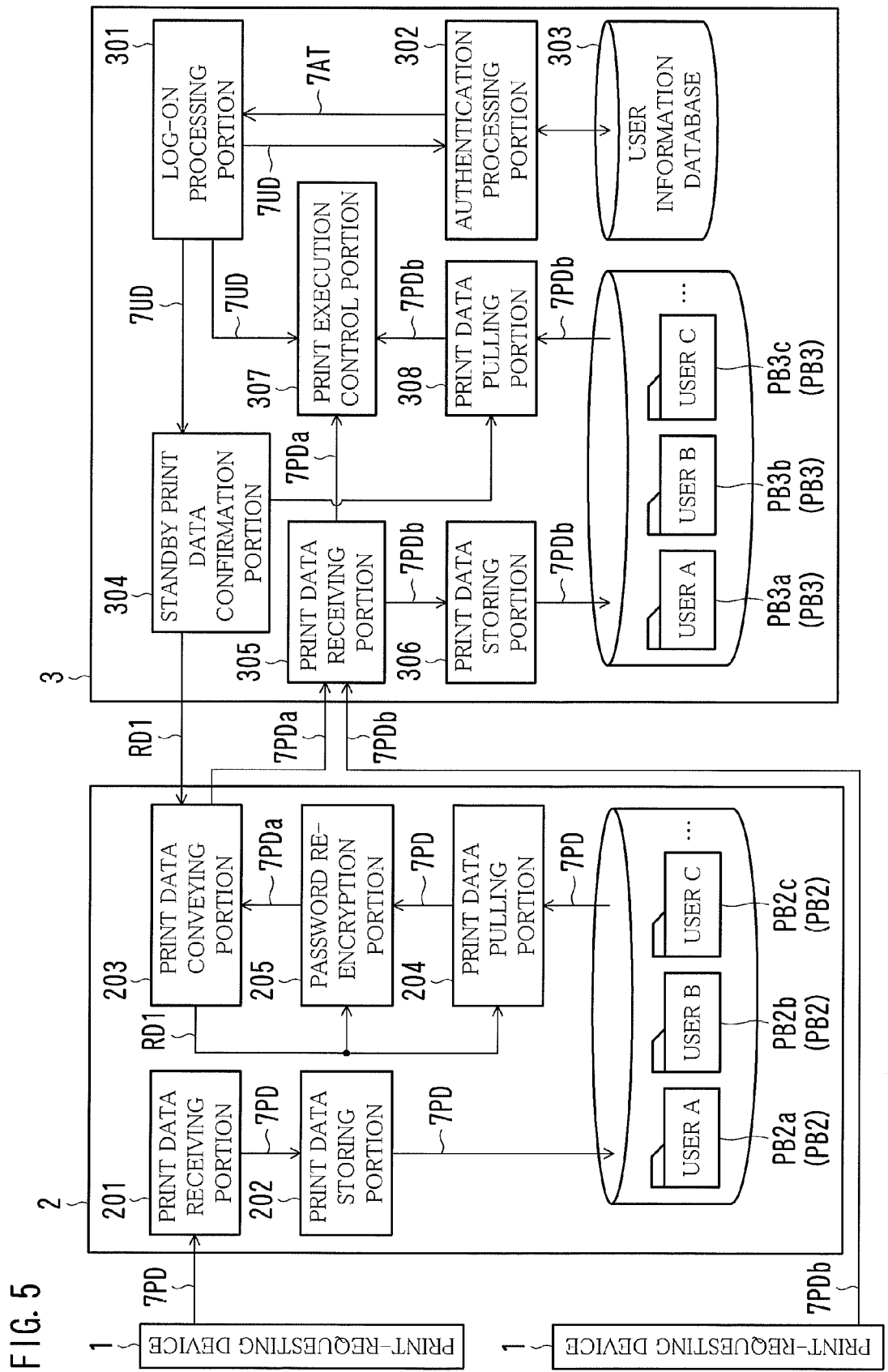
FIG. 5 is a diagram showing an example of a partial functional configuration of a print server and a printer.

FIG. 4 is a diagram showing an example of a partial functional configuration of the print-requesting device 1 and the print server 2, and FIG. 5 is a diagram showing an example of a partial functional configuration of the print server 2 and the printer 3.

Referring to FIG. 4, the print-requesting device 1 is configured of control portions such as a document data obtaining portion 101, a printing-compatible processing portion 102, a pull printing-compatible processing portion 103, and a print data issuing portion 104. The printing-compatible processing portion 102 is provided with a password encryption portion 102a and a print data creation portion 102b. The pull printing-compatible processing portion 103 is provided with a print server operation determination portion 103a, a password re-encryption portion 103b, and a print settings changing portion 103c. The individual control portions 101-104 serve as printer drivers in the print-requesting device 1. The ROM or the auxiliary storage devices of the print-requesting device 1 stores, therein, programs for implementing the functions of the control portions 101 through 104. The CPU executes the programs appropriately. The print-requesting device 1 also has an Operating System (OS) and application software such as document creation software installed thereon. The OS and the software are also executed appropriately.

Referring to FIGS. 4 and 5, the print server 2 is configured of control portions, e.g., a print data receiving portion 201, a print data storing portion 202, a print data conveying portion 203, a print data pulling portion 204, and a password re-encryption portion 205. The ROM or the auxiliary storage devices of the print server 2 stores, therein, programs for implementing the functions of the control portions 201 through 205. The CPU executes the programs appropriately. As shown in FIGS. 4 and 5, the auxiliary storage device of the print server 2 has personal boxes PB2 (PB2a, Pb2b, PB2c, . . . ) created for each of users (user A, user B, user C, . . . ) of the printing system SYS1. Each of the personal boxes PB2 is protected by a password set for the corresponding user. Each of the personal boxes PB2 stores, therein, print data of the corresponding user.

Referring to FIG. 5, the printer 3 is configured of control portions, e.g., a log-on processing portion 301, an authentication processing portion 302, a user information database 303, a standby print data confirmation portion 304, a print data receiving portion 305, a print data storing portion 306, a print execution control portion 307, and a print data pulling portion 308. The ROM 33 or the HDD 34 of the printer 3 stores, therein, programs for implementing the functions of the control portions 301 through 308. The CPU 31 executes the programs appropriately. As shown in FIG. 5, the HDD 34 of the printer 3 has personal boxes PB3 (PB3a, PB3b, PB3c, . . . ) created for each of users (user A, user B, user C, . . . ) of the printing system SYS1. Each of the personal boxes PB3 is protected by a password set for the corresponding user. Each of the personal boxes PB3 stores, therein, print data of the corresponding user.

The functions of the print-requesting device 1, the print server 2, and the printer 3 shown in FIGS. 4 and 5 shall be described, the descriptions being broadly divided between a case where the print server 2 is in operation and a case where the print server 2 is not in operation.

[Case where the Print Server 2 is in Operation]

Figure 6:
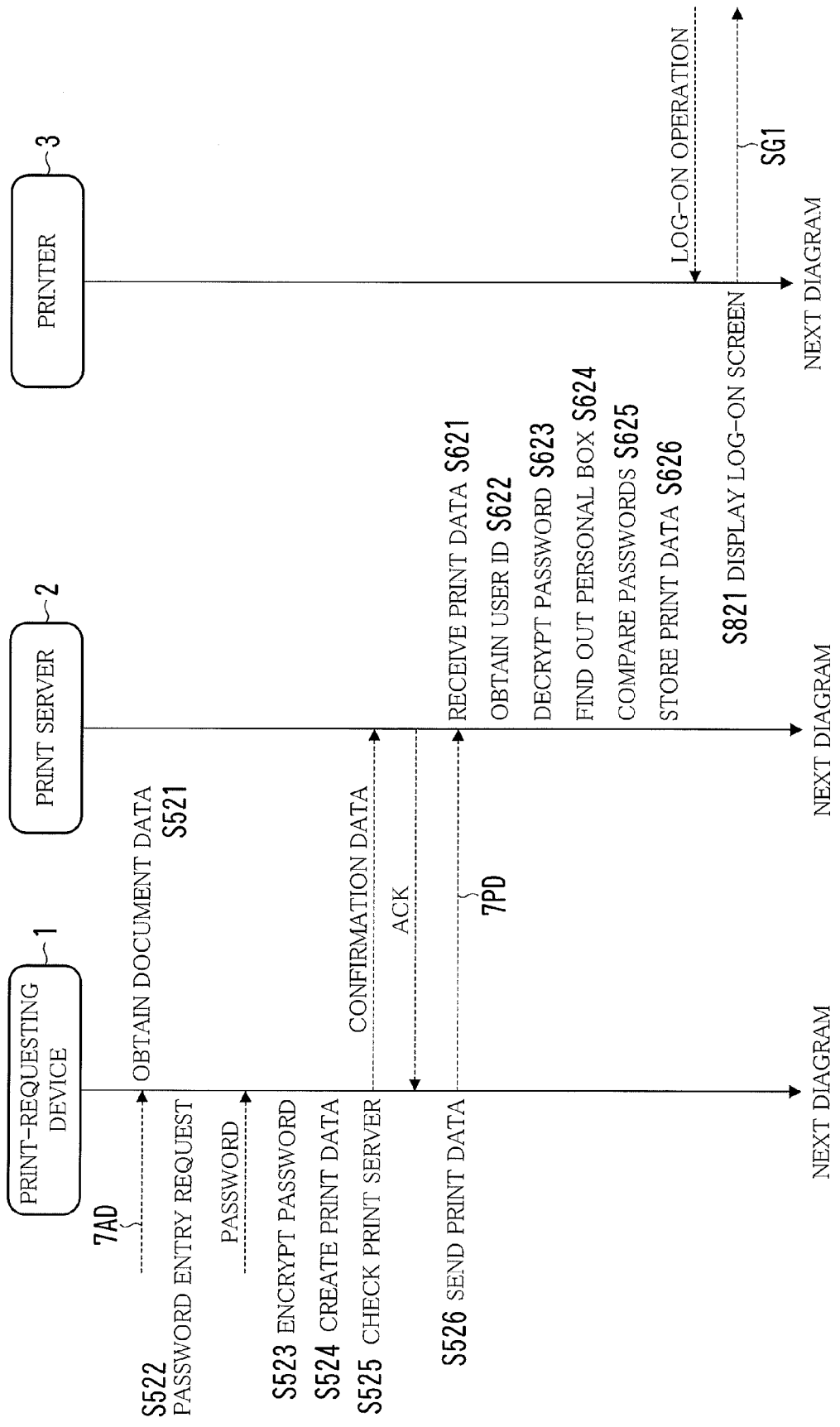
FIG. 6 is a sequence diagram depicting an example of the flow of processes performed by the individual devices when a print server is in operation.
Figure 7:
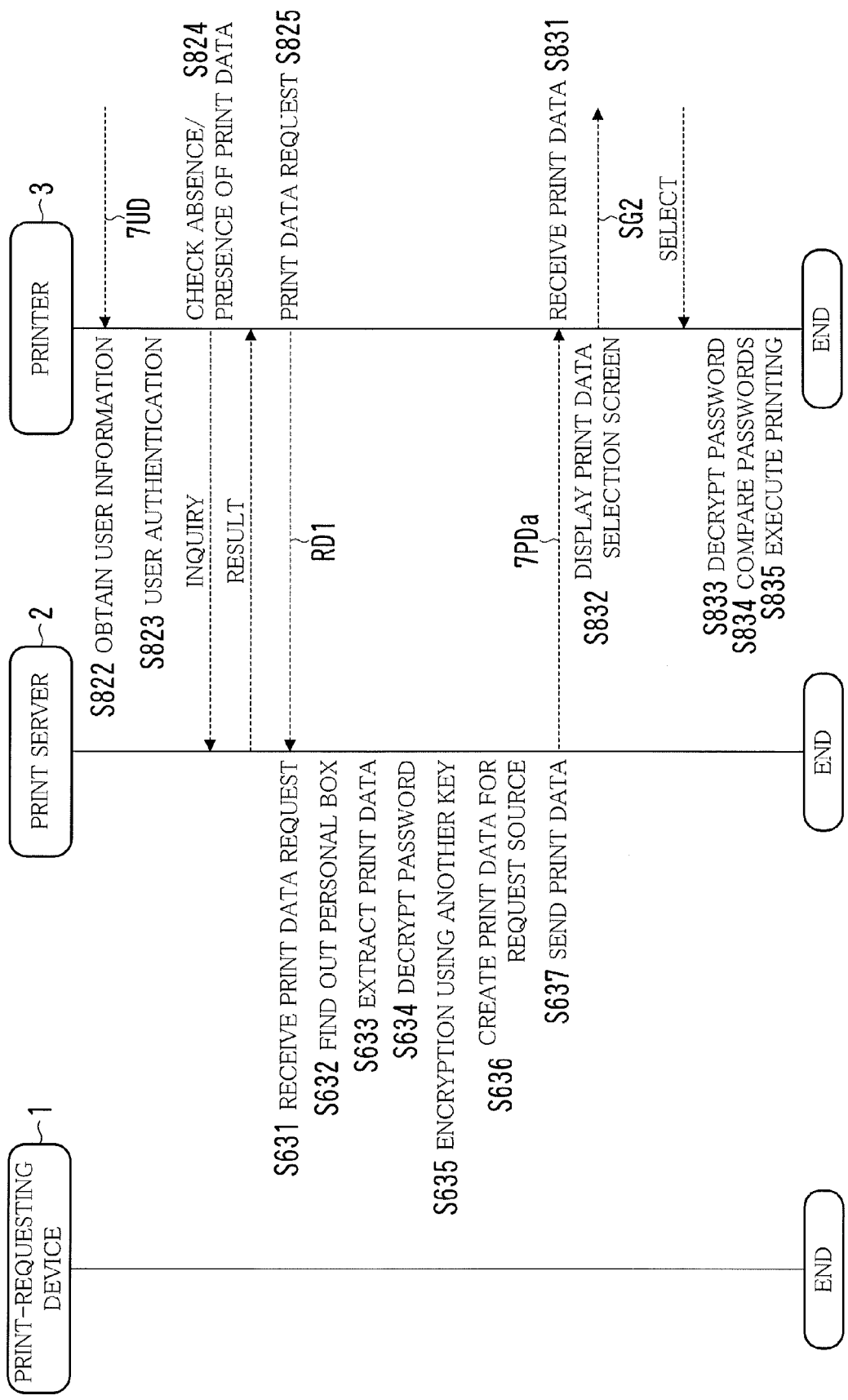
FIG. 7 is a sequence diagram depicting an example of the flow of processes performed by the individual devices when a print server is in operation.
Figure 8:
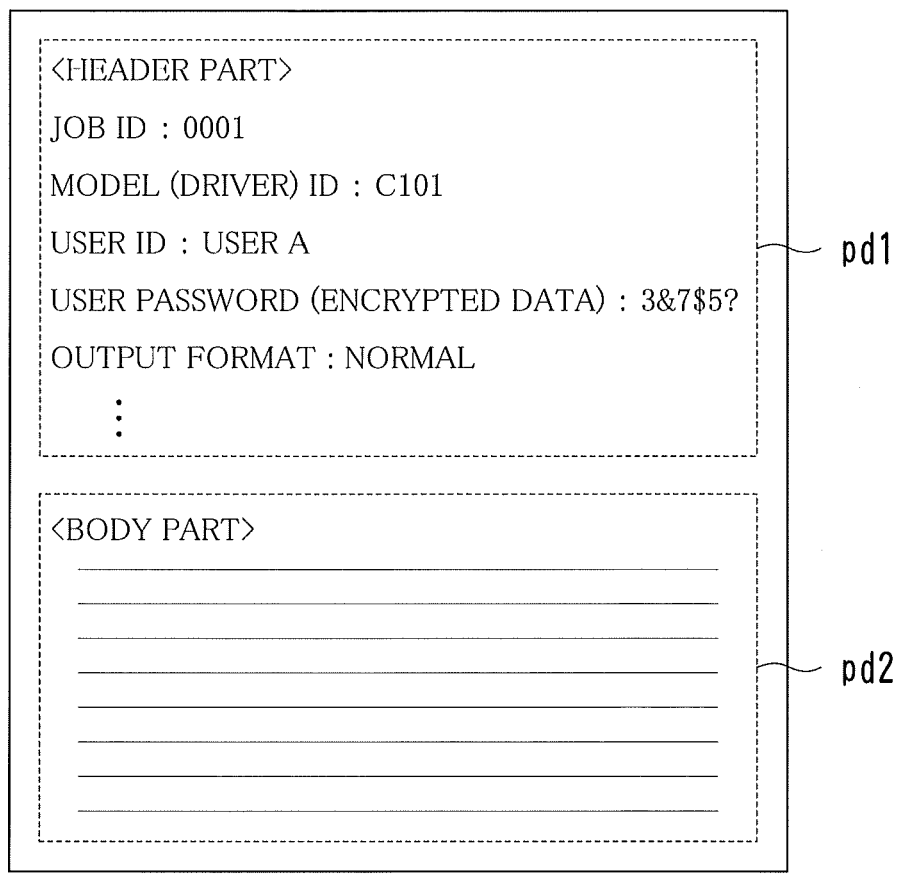
FIG. 8 is a diagram showing an example of print data.
Figure 9:
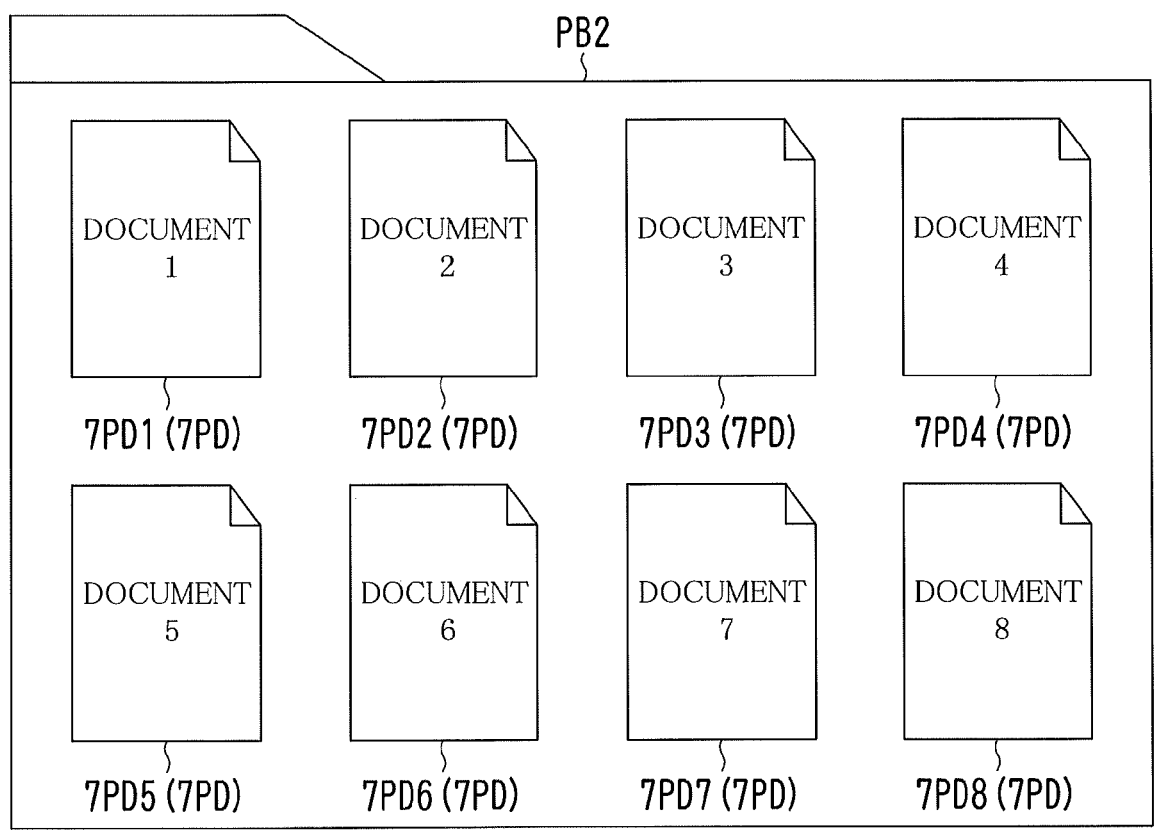
FIG. 9 is a diagram showing an example of data saved in a personal box.
Figure 10:
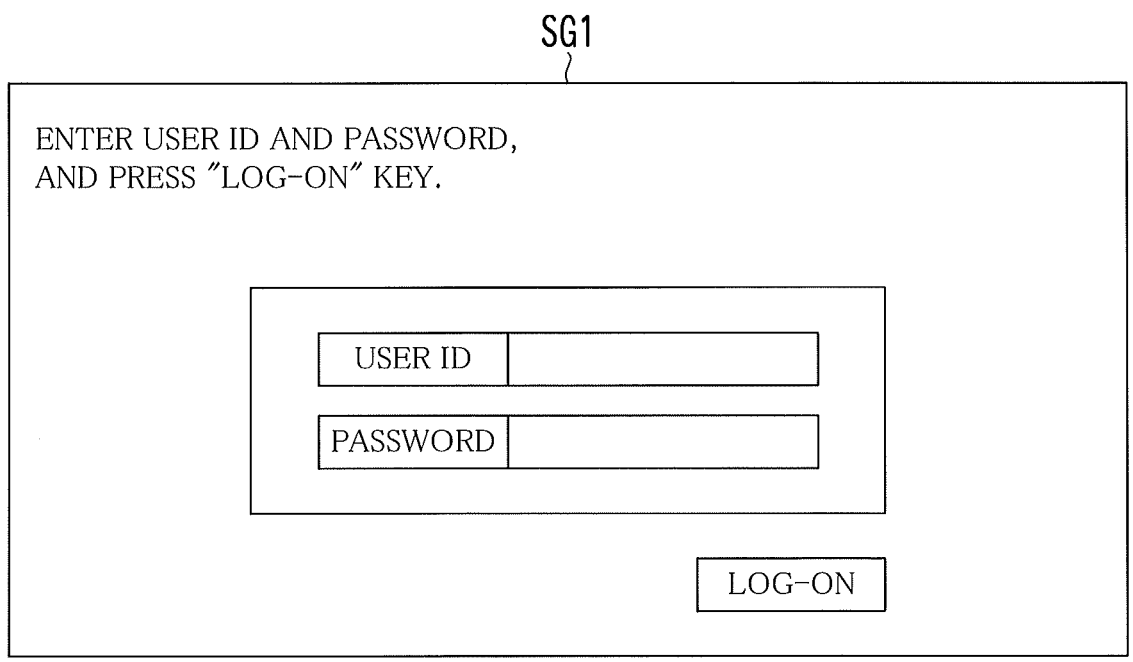
FIG. 10 is a diagram showing an example of a user log-on screen.
Figure 12:
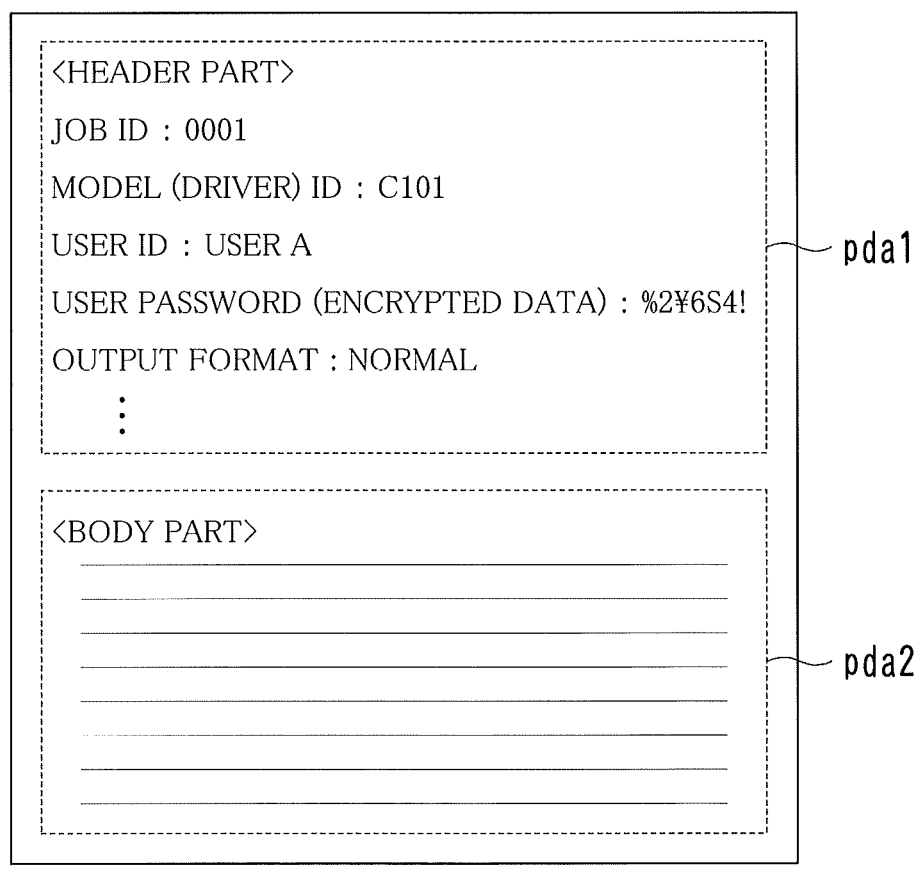
FIG. 12 is a diagram showing an example of print data.
Figure 13:
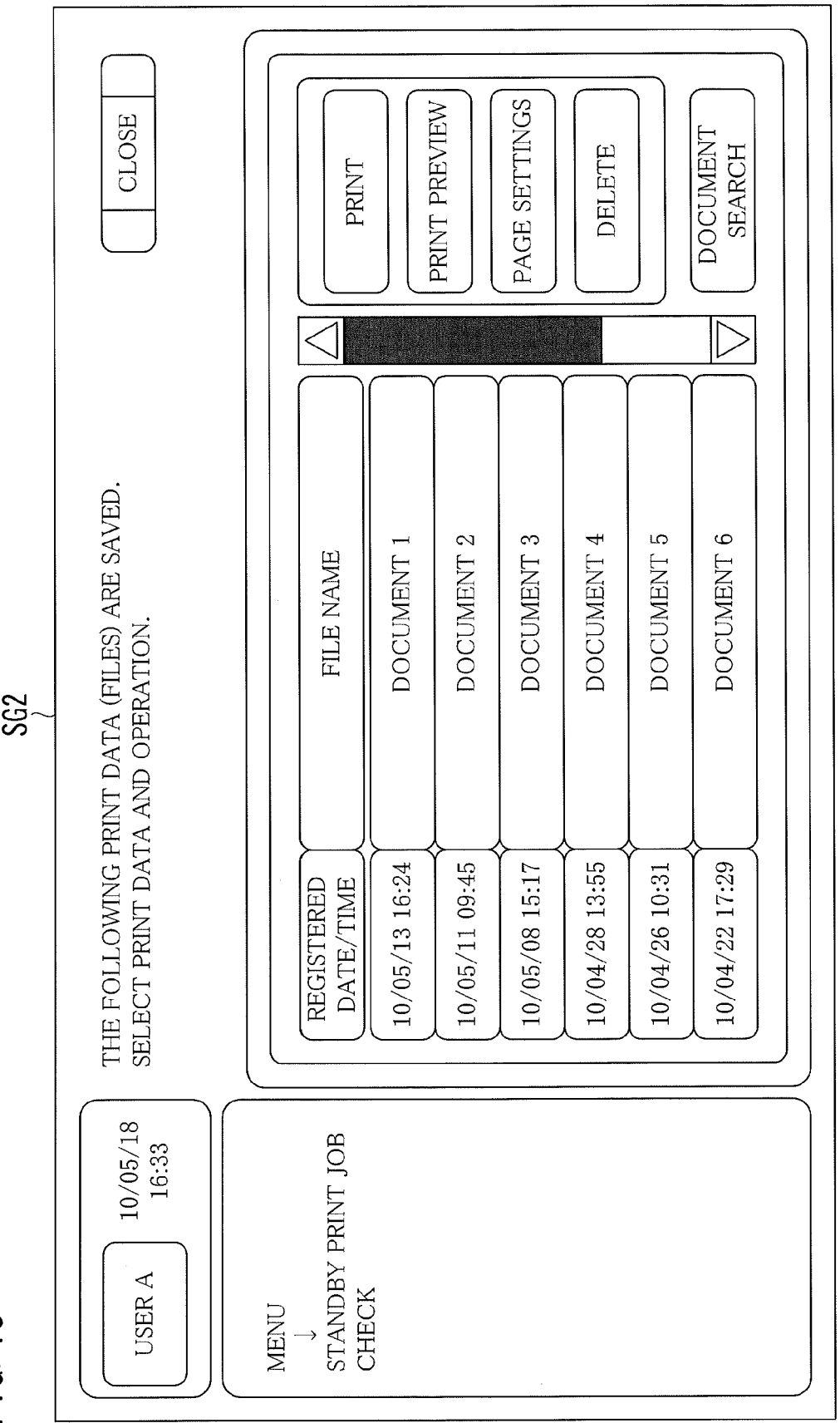
FIG. 13 is a diagram showing an example of a print data selection screen.

FIGS. 6 and 7 are sequence diagrams depicting an example of the flow of processes performed by the individual devices when the print server 2 is in operation; FIG. 8 is a diagram showing an example of print data 7PD; FIG. 9 is a diagram showing an example of data saved in the personal box PB2; FIG. 10 is a diagram showing an example of a user log-on screen SG1; FIG. 11 is a diagram showing an example of an encryption key table ETB; FIG. 12 is a diagram showing an example of print data 7PDa; and FIG. 13 is a diagram showing an example of a print data selection screen SG2.

With reference to FIGS. 6 and 7, descriptions are given below of the individual functions of the print-requesting device 1, the print server 2, and the printer 3 for a case where the print server 2 is in operation.

When a user performs operation for printing the contents of a document file created by using the document creation software or the like, the document data obtaining portion 101 (see FIG. 4) of the print-requesting device 1 obtains document data 7AD indicating the contents of such a document file from the document creation software (S521 of FIG. 6).

The individual portions of the printing-compatible processing portion 102 create print data 7PD in which information necessary to perform the printing is described in a predetermined printer language as shown in FIG. 8 based on the document data 7AD obtained by the document data obtaining portion 101. A method for creating the print data 7PD is as follows (S522 through S524).

The password encryption portion 102a shows a message to request the user to enter a password (S522). The password encryption portion 102a, then, encrypts the password entered by the user by using an encryption key specific to the printing-compatible processing portion 102 (S523). Note that the "specific encryption key" in this case is an encryption key given to a printer 3 of the model type with which the printing-compatible processing portion 102 is compatible.

The print data creation portion 102b creates print data 7PD containing the document data 7AD obtained by the document data obtaining portion 101, the password encrypted by the password encryption portion 102a, and so on (S524). The print data 7PD is described in a predetermined printer language.

Referring to FIG. 8, the print data 7PD includes a header part pd1 and a body part pd2. The header part pd1 contains a job ID (identification) to identify the subject print data 7PD, a model ID (identification) to identify a model for which the subject print data 7PD is created, i.e., which printer driver model is used to create the subject print data 7PD, a user ID (identification) to identify a user who has given a command to perform the printing, user password information indicating an encrypted password corresponding to a password entered by the user who has given the command, and output mode information indicating an output mode of printing based on the subject print data 7PD. The body part pd2 contains information for reproducing an image to be outputted.

The print server operation determination portion 103a of the pull printing-compatible processing portion 103 discerns whether or not the print server 2 is in operation by, for example, checking the status of communication between the print-requesting device 1 and the print server 2 (S525).

If the print server operation determination portion 103a determines that the print server 2 is in operation, then the print data issuing portion 104 sends, to the print server 2, the print data 7PD generated by the printing-compatible processing portion 102 (S526).

In the print server 2, the print data receiving portion 201 receives the print data 7PD from the print-requesting device 1 (S621).

The print data storing portion 202 performs processing for saving the print data 7PD received by the print data receiving portion 201 to a personal box in the following manner (S622 through S626).

The print data storing portion 202 obtains the user ID contained in the header part pd1 of the print data 7PD (S622). The print data storing portion 202 further decrypts the password indicated in the user password information contained in the header part pd1, and thereby, obtains the password that the user has entered into the print-requesting device 1 (S623). The print data storing portion 202 finds out a personal box PB2 corresponding to the obtained user ID among the personal boxes PB2 of users (S624). The print data storing portion 202 then checks the obtained password against a password used to restrict access to the personal box PB2 thus found out (S625). If there is a match therebetween, then the print data storing portion 202 saves the print data 7PD to the personal box PB2 thus found out (S626).

Where a common key cryptosystem is adopted, the print data storing portion 202 uses, as a decryption key, an encryption key used to encrypt the password in the print-requesting device 1. On the other hand, where a public key cryptosystem is adopted, the print data storing portion 202 uses, as a decryption key, a secret key corresponding to a public key used to encrypt the password in the print-requesting device 1.

The processing described above is performed in due order, so that sets of print data 7PD (7PD1, 7PD2, 7PD3, ... ) are saved to the corresponding personal boxes PB2 (PB2a, PB2b, PB2c, ... ) created in the auxiliary storage device of the print server 2 as shown in FIG. 9.

The user operates any one of the printers 3 (3A-3C) directly to cause that printer 3 to perform printing based on the print data 7PD spooled on the print server 2. The following description provides an example in which the printer 3A is used to perform printing.

In the printer 3A, when the user performs predetermined operation, the log-on processing portion 301 performs log-on processing in the following manner.

The log-on processing portion 301 displays a user log-on screen SG1 as that shown in FIG. 10 on the display operation device 35 (S821). The log-on processing portion 301 then obtains, through the display operation device 35, user data 7UD indicating a user ID and password entered by the user (S822 of FIG. 7).

The authentication processing portion 302 performs user authentication by matching the user ID and password contained in the user data 7UD obtained by the log-on processing portion 301 against a user ID and password stored in the user information database 303 (S823). To be specific, if a match is found between the user ID and password contained in the user data 7UD and the user ID and password stored in the user information database 303, then the authentication processing portion 302 determines that the user is an authorized user. When the user is successfully authenticated, he/she is allowed to log onto the printer 3A. At this time, the authentication processing portion 302 gives the log-on processing portion 301 an authentication ticket 7AT.

When the log-on processing portion 301 receives the authentication ticket 7AT from the authentication processing portion 302, the standby print data confirmation portion 304 checks whether or not print data 7PD of the log-on user is spooled on the print server 2 (S824). If the print data 7PD of the log-on user is spooled thereon, then the standby print data confirmation portion 304 requests the print server 2 to send the print data 7PD to the printer 3A (S825).

To be specific, the standby print data confirmation portion 304 presents the user ID contained in the user data 7UD to the print server 2, and thereby, inquires of the print server 2 as to whether or not the print data 7PD of the log-on user is spooled on the print server 2. If the print data 7PD is spooled thereon, then the standby print data confirmation portion 304 issues, to the print server 2, print data transmission request RD1 to ask the print server 2 to send the print data 7PD. The print data transmission request RD1 indicates the user ID contained in the user data 7UD and a model ID of the subject printer 3A.

In the print server 2, the print data conveying portion 203 receives the print data transmission request RD1 from the printer 3A (S631).

In response to this operation, the print data pulling portion 204 finds out a personal box PB2 corresponding to the user ID indicated in the print data transmission request RD1 among the personal boxes PB2 of users (S632). The print data pulling portion 204, then, pulls out all or a part of the print data 7PD saved in the personal box PB2 thus found out (S633).

The password re-encryption portion 205 decrypts the password indicated in the user password information contained in the header part pd1 of the print data 7PD pulled out by the print data pulling portion 204. As a result, the password entered into the print-requesting device 1 by the user is obtained (S634). The password re-encryption portion 205 encrypts again the obtained password by using an encryption key corresponding to the model ID indicated in the print data transmission request RD1 (S635).

The password re-encryption portion 205 refers to the encryption key table ETB as that shown in FIG. 11 and determines an encryption key to be used. For example, when the print data transmission request RD1 indicates a model ID "C102", the password re-encryption portion 205 determines that an encryption key to be used is "XXX2", which is shown in the encryption key field etb2 of a record having the value of "C102" in the model ID field etb1 of the encryption key table ETB.

The password re-encryption portion 205, then, replaces the password indicated in the user password information of the header part pd1 of the print data 7PD with the post-reencryption password, so that print data 7PDa as that shown in FIG. 12 is generated (S636).

The print data conveying portion 203 sends, to the printer 3A, the print data 7PDa created by the password re-encryption portion 205 (S637).

In the printer 3A, the print data receiving portion 305 receives the print data 7PDa from the print server 2 (S831). Subsequently, the print data selection screen SG2 as that shown in FIG. 13 is displayed on the display operation device 35 (S832). The print data selection screen SG2 shows a list of sets of received print data 7PDa. The user selects, on the print data selection screen SG2, print data 7PDa that is to be used as a print target this time.

In response to the selection, the print execution control portion 307 decrypts the password indicated in the user password information contained in the header part pda1 of the print data 7PDa selected by the user. As a result, the password that has been entered into the print-requesting device 1 by the user is obtained (S833). The print execution control portion 307, then, matches the password thus obtained against the password contained in the user data 7UD (S834). If a match is found therebetween, then the print execution control portion 307 controls the printing unit 37 in such a manner that the printing is performed based on the print data 7PDa selected by the user. Thereby, the printing unit 37 prints an image indicated in the print data 7PDa onto paper or the like (S835). Unless a match is found therebetween, the printing based on the print data 7PDa is not performed.

As discussed above, in the case where the print server 2 is in operation, a user can easily cause a printer to perform printing based on print data spooled on the print server 2. Further, since printing follows authentication using password verification, the security of a printed matter is ensured.

[Case where the Print Server 2 is not in Operation]

Figure 14:
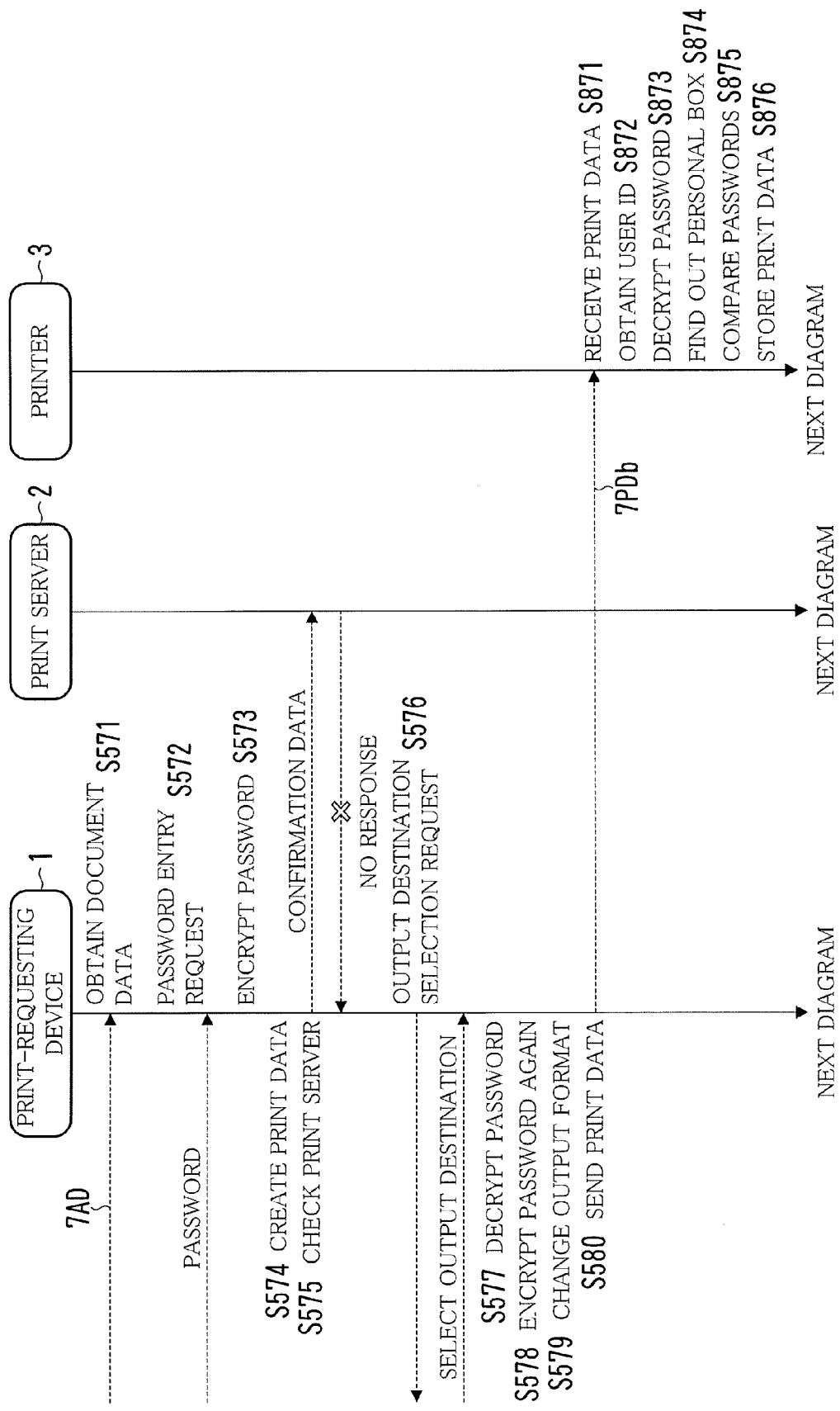
FIG. 14 is a sequence diagram depicting an example of the flow of processes performed by the individual devices when a print server is not in operation.
Figure 15:
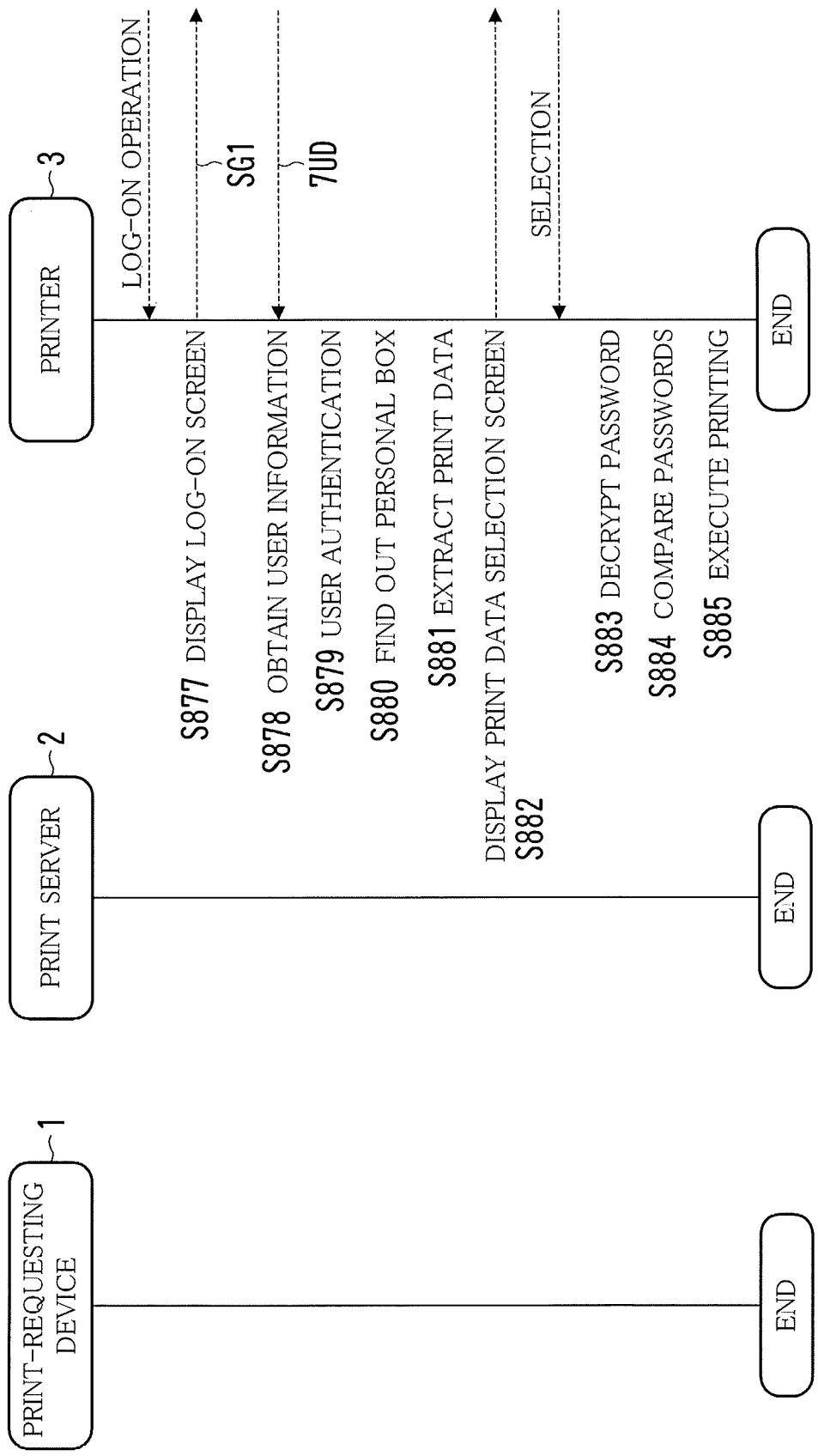
FIG. 15 is a sequence diagram depicting an example of the flow of processes performed by the individual devices when a print server is not in operation.
Figure 16:
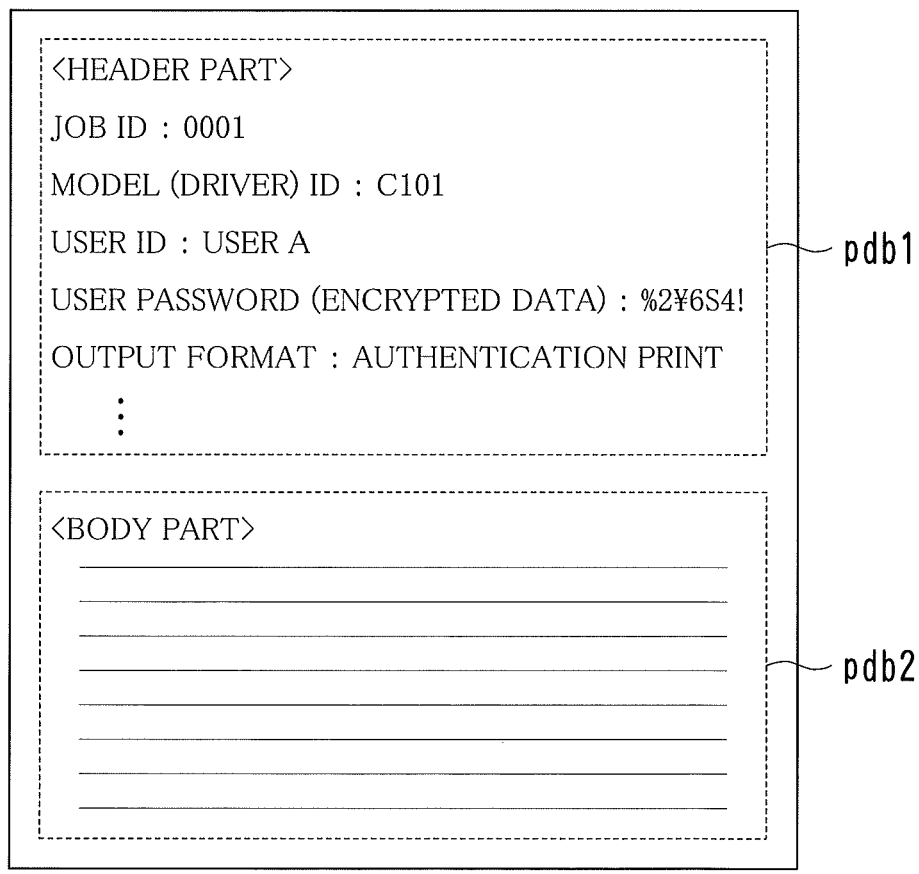
FIG. 16 is a diagram showing an example of print data.
Figure 17:
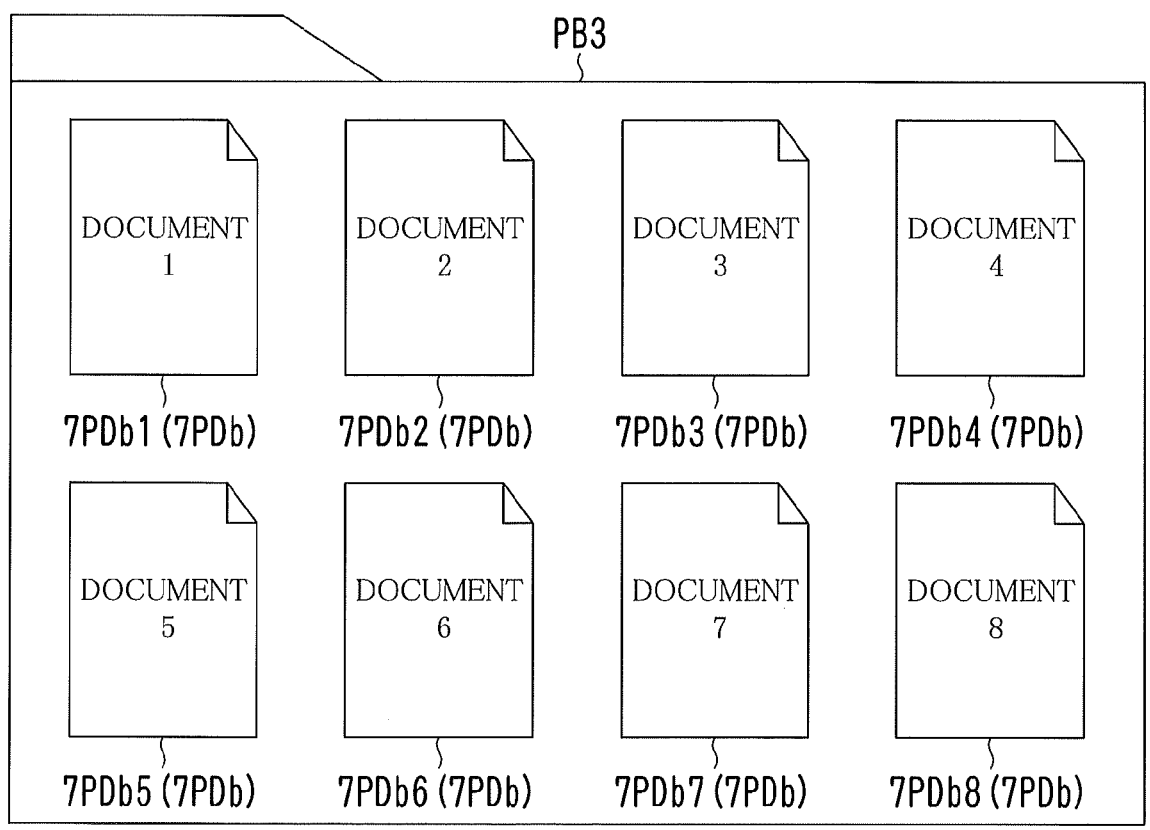
FIG. 17 is a diagram showing an example of data saved in a personal box.

FIGS. 14 and 15 are sequence diagrams depicting an example of the flow of processes performed by the individual devices when the print server 2 is not in operation; FIG. 16 is a diagram showing an example of print data 7PDb; and FIG. 17 is a diagram showing an example of data saved in a personal box PB3.

With reference to FIGS. 14 and 15, descriptions are given below of the individual functions of the print-requesting device 1 and the printer 3 for a case where the print server 2 is not in operation. Description of points common to the case where the print server 2 is in operation shall be omitted.

As with the case where the print server 2 is in operation (S521 through S525 of FIG. 6), in the print-requesting device 1, the document data obtaining portion 101 and the printing-compatible processing portion 102 create print data 7PD based on document data 7AD (S571 through S574 of FIG. 14), and the print server operation determination portion 103a discerns whether or not the print server 2 is in operation (S575).

When the print server operation determination portion 103a determines that the print server 2 is not in operation, the individual portions of the pull printing-compatible processing portion 103 create print data 7PDb as that shown in FIG. 16 in the following manner.

The password re-encryption portion 103b displays a message to request a user to select any one of the printers 3 (3A-3C) as the output destination printer (S576). When any one of the printers 3 is selected, the password re-encryption portion 103b decrypts the password indicated in the header part pd1 of the print data 7PD, and thereby, obtains the password that has been entered by the user (S577). The obtained password (original password) is encrypted again by using an encryption key corresponding to the model ID of the printer 3 selected by the user (S578). As with the case where the print server 2 is in operation, the encryption key is determined with reference to the encryption key table ETB as that shown in FIG. 11.

The password re-encryption portion 103b, then, changes the password indicated in the user password information contained in the header part pd1 of the print data 7PD to the post-reencryption password.

The print settings changing portion 103c changes a print output mode indicated in the output mode information contained in the header part pd1 of the print data 7PD (S579). To be specific, the print output mode is changed from a normal mode to a mode in which printing follows authentication (authentication print mode) (S579).

In this way, the password indicated in the print data 7PD is encrypted again and a mode is changed to another mode, so that print data 7PDb is generated.

The print data issuing portion 104 sends the print data 7PDb thus generated to the printer 3 selected by the user (S580). The following is a description of an example in which the user selects the printer 3B.

In the printer 3B, when the print data receiving portion 305 receives the print data 7PDb (S871), the print data storing portion 306 performs processing for saving the print data 7PDb to a personal box PB3 of the user (S872 through S876). The processing details are the same as those performed by the print server 2 for a case where the print server 2 is in operation (S621 through S626 of FIG. 6).

The processing described above is performed in due order, so that sets of print data 7PDb (7PDb1, 7PDb2, 7PDb3, ...) are saved to the corresponding personal boxes PB3 (PB3a, PB3b, PB3c, ...) as shown in FIG. 17.

The user operates the printer 3B directly to cause the same to perform printing based on the print data 7PDb spooled on the printer 3B.

In the printer 3B, the log-on processing portion 301 and the authentication processing portion 302 perform processing for user authentication and log-on to the printer 3B (S877 through S879). The processing details are the same as those described earlier with reference to S821 of FIG. 6 through S823 of FIG. 7.

When the user is successfully authenticated, the print data pulling portion 308 finds out a personal box PB3 corresponding to the user ID contained in the user data 7UD (S880), and pulls out all or a part of the print data 7PDb saved in the personal box PB3 thus found out (S881). The display operation device 35 is controlled to display a screen that shows a list of the print data 7PDb thus pulled out and is similar to the print data selection screen SG2 as shown in FIG. 13. The user selects, on the screen thus displayed, print data 7Pdb that is to be used as a print target (S882).

The print execution control portion 307 decrypts the password contained in the header part pdb1 of the print data 7PDb selected by the user. As a result, the password that has been entered into the print-requesting device 1 by the user is obtained (S883). The print execution control portion 307, then, matches the password thus obtained against the password contained in the user data 7UD (S884). If a match is found therebetween, then the print execution control portion 307 controls the printing unit 37 in such a manner the printing is performed based on the print data 7PDb selected by the user. Thereby, the printing unit 37 prints an image indicated in the print data 7PDb onto paper or the like (S885). Unless a match is found therebetween, the printing based on the print data 7PDb is not performed.

As discussed above, also in the case where the print server 2 is not in operation, a user can cause a printer to perform printing in a secure manner merely by designating a printer 3 to be used for the printing. Further, there is no need to install, into the print-requesting device 1, a printer driver corresponding to the designated printer 3, which provides the user with convenience.

Figure 18:
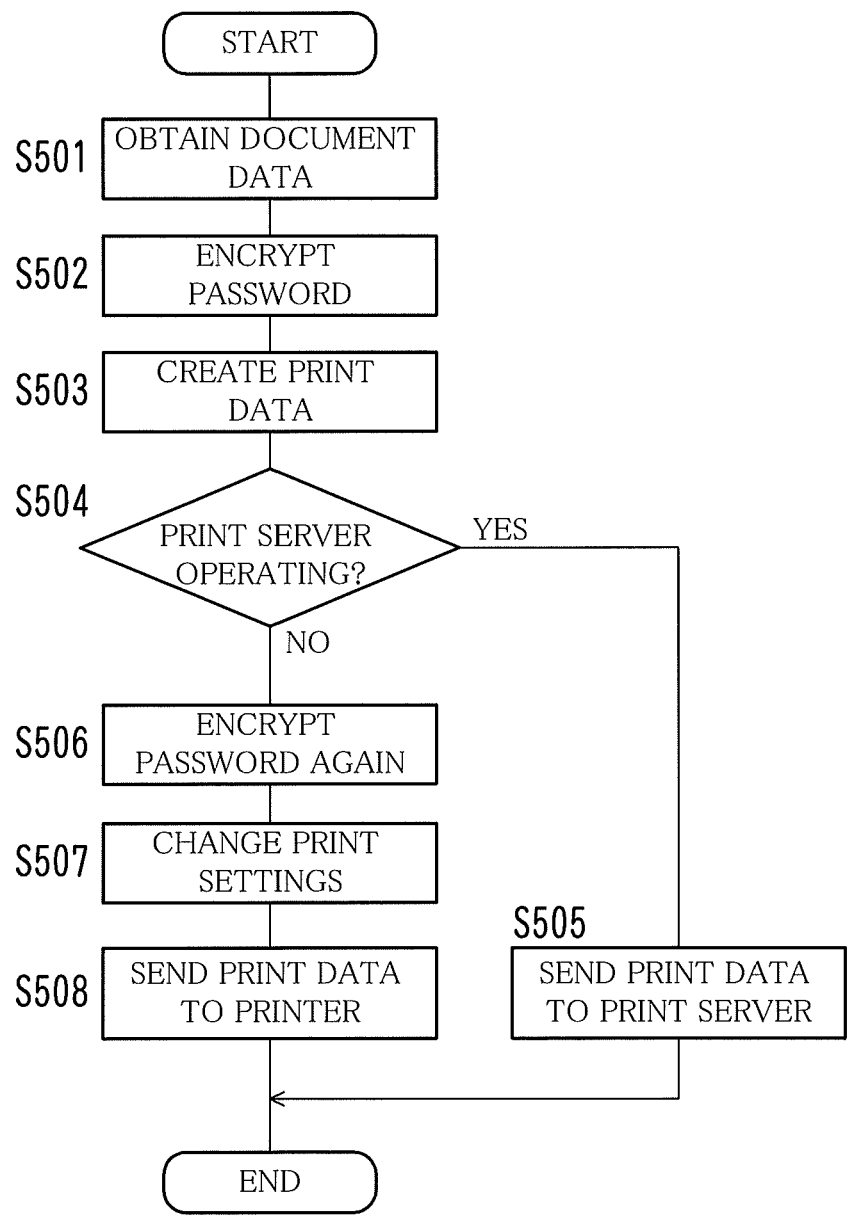
FIG. 18 is a flowchart depicting an example of the flow of processes performed by a print-requesting device.
Figure 19:
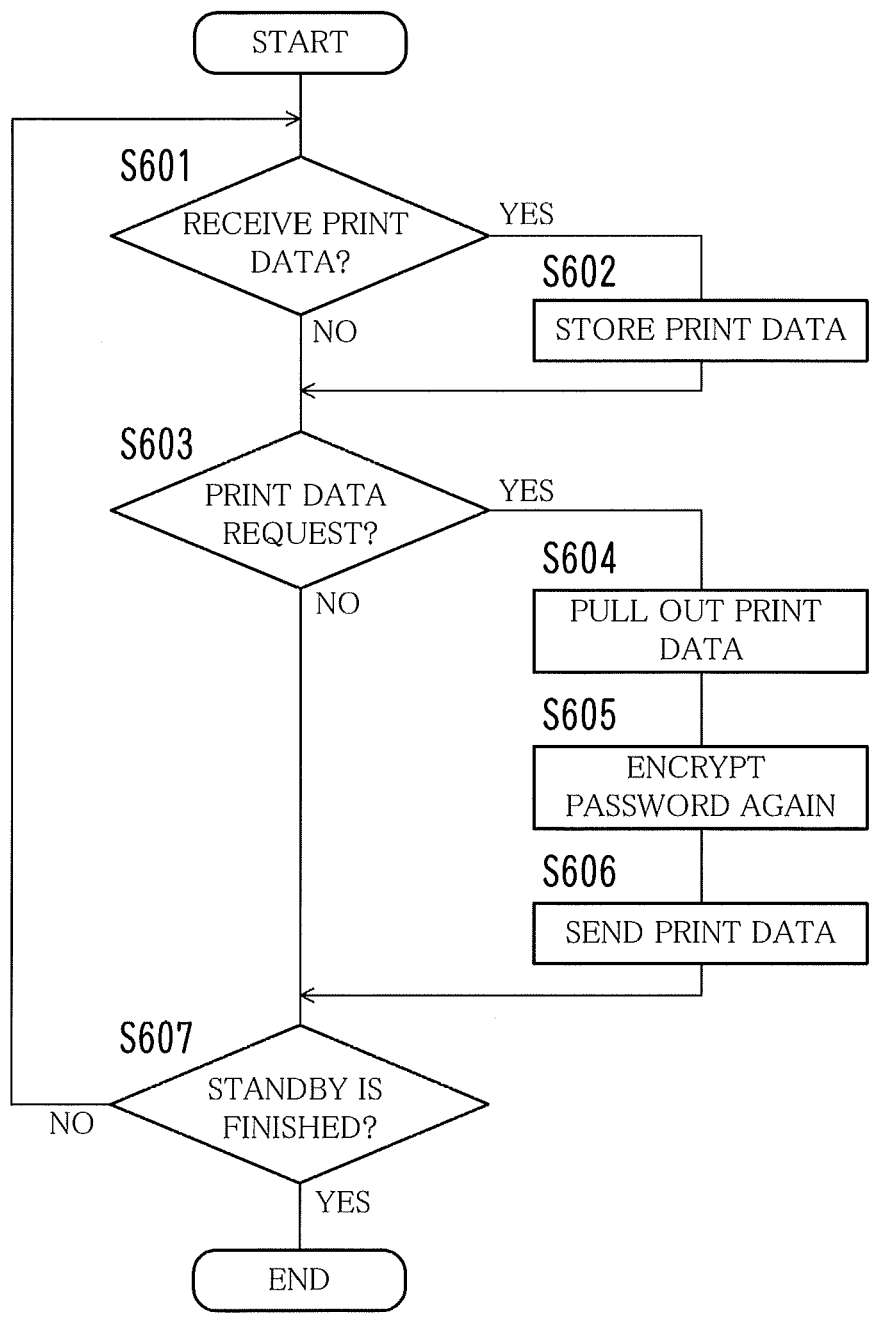
FIG. 19 is a flowchart depicting an example of the flow of processes performed by a print server.
Figure 20:
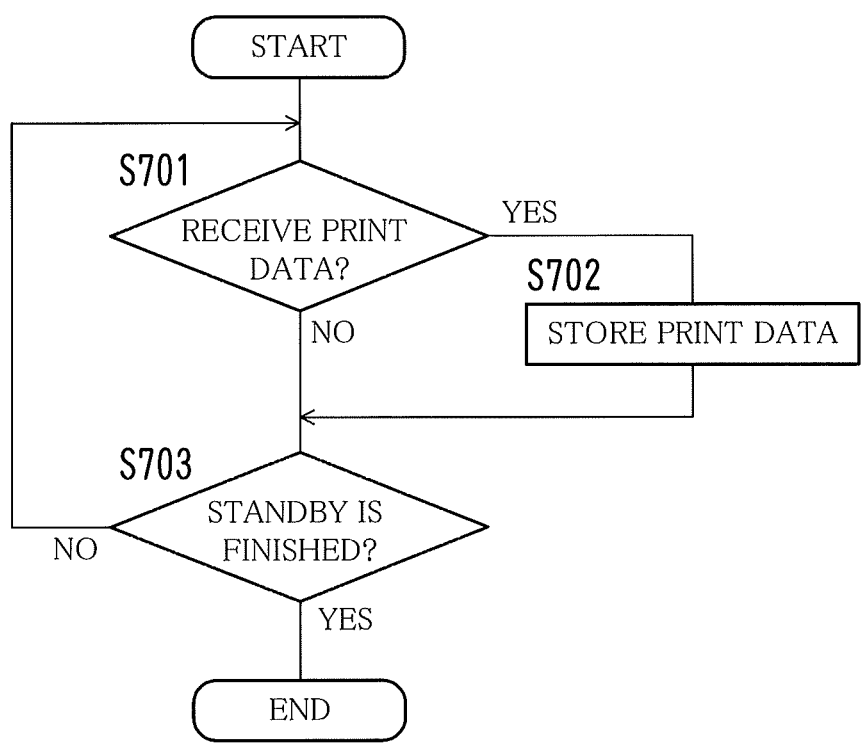
FIG. 20 is a flowchart depicting an example of the flow of processes performed by a printer.
Figure 21:
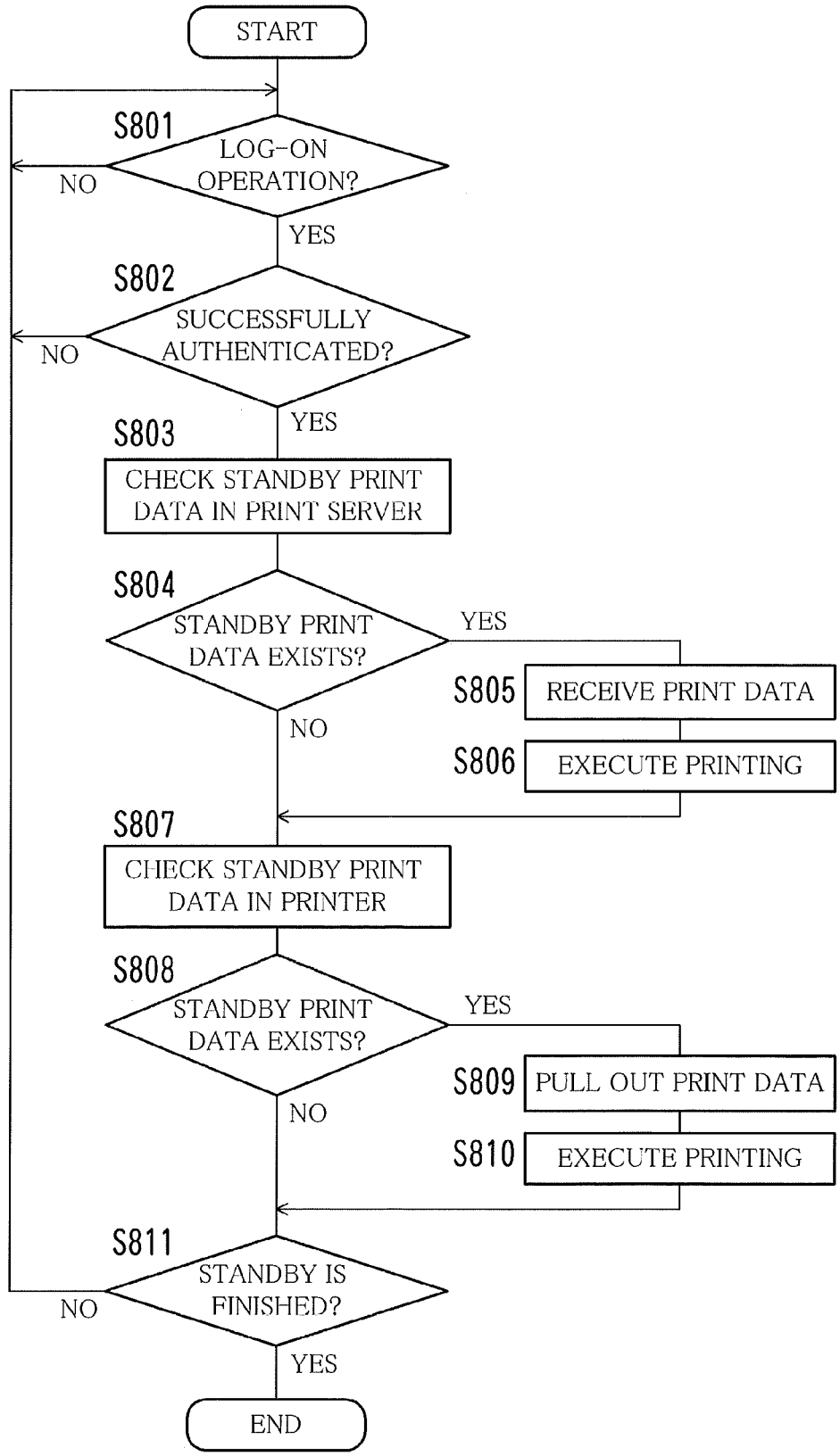
FIG. 21 is a flowchart depicting an example of the flow of processes performed by a printer.

FIG. 18 is a flowchart depicting an example of the flow of processes performed by the print-requesting device 1; FIG. 19 is a flowchart depicting an example of the flow of processes performed by the print server 2; and FIGS. 20 and 21 are flowcharts depicting an example of the flow of processes performed by the printer 3.

With reference to the flowcharts of FIGS. 18 through 21, descriptions are provided below of the entire flow of processing performed by the individual devices.

A user prepares print target document data 7AD in the print-requesting device 1, and enters a password thereinto.

Referring to FIG. 18, when obtaining the document data 7AD (S501), the print-requesting device 1 encrypts the password entered by the user (S502) to generate the print data 7PD as that shown in FIG. 8 (S503).

The print-requesting device 1, then, confirms the status of the print server 2. If the print server 2 is in operation (Yes in S504), then the print-requesting device 1 sends the print data 7PD to the print server 2 (S505).

On the other hand, if the print server 2 is not in operation (No in S504), then the print-requesting device 1 prompts the user to select a printer 3 to be used for printing, and uses an encryption key corresponding to the printer 3 selected by the user to encrypt again the password entered by the user (S506). In parallel with this or before or after, the print-requesting device 1 changes print settings (S507). When the print data 7PD undergoes the foregoing processing, the print data 7PDb as that shown in FIG. 16 is generated. The print-requesting device 1, then, sends the print data 7PDb to the printer 3 selected by the user (S508).

Referring to FIG. 19, every time the print server 2 receives print data 7PD from the print-requesting device 1 (Yes in S601), the print server 2 saves the print data 7PD to a personal box PB2 of the user who has made the request to perform printing corresponding to the print data 7PD (S602).

Alternatively, every time the print server 2 receives print data transmission request RD1 from the printer 3 (Yes in S603), the print server 2 extracts print data 7PD from a personal box PB2 corresponding to a user ID indicated in the print data transmission request RD1 (S604), decrypts the password indicated in the extracted print data 7PD, uses an encryption key corresponding to the printer 3 to encrypt the password again, and generates print data 7PDa (S605). The print server 2, then, sends the print data 7PDa to the printer 3 (S606).

The printer 3 executes the processing shown in FIG. 20 in parallel with the processing shown in FIG. 21. Referring to FIG. 20, every time the printer 3 receives print data 7PDb from the print-requesting device 1 (Yes in S701), the printer 3 saves the print data 7PDb to a personal box PB3 corresponding to a user ID indicated in the print data 7PDb (S702).

Referring to FIG. 21, every time a user logs onto the printer 3 successfully (Yes in S801 and Yes in S802), the printer 3 checks whether or not print data 7PD is saved in a personal box PB2 which is provided in the print server 2 and corresponds to the user (S803). If such print data 7PD is saved therein (Yes in S804), then the printer 3 receives print data 7PDa corresponding to the print data 7PD from the print server 2 (S805), and performs printing based on the print data 7PDa (S806).

The printer 3 also checks whether or not print data 7PDb is saved in a personal box PB3 which is provided in the subject printer 3 and corresponds to the user (S807). If such print data 7PDb is saved therein (Yes in S808), then the printer 3 extracts the print data 7PDb (S809), and performs printing based on the print data 7PDb (S810).

[Second Embodiment]

Figure 22:
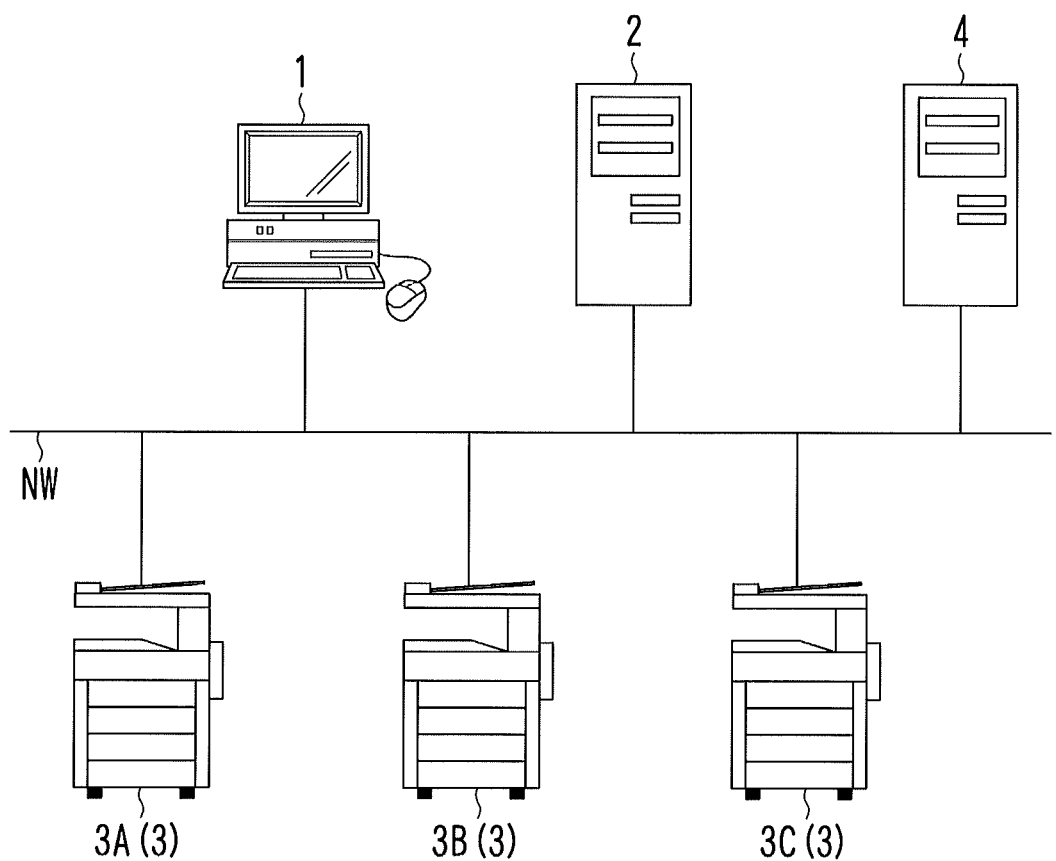
FIG. 22 is a diagram showing an example of a printing system according to a second embodiment.
Figure 23:
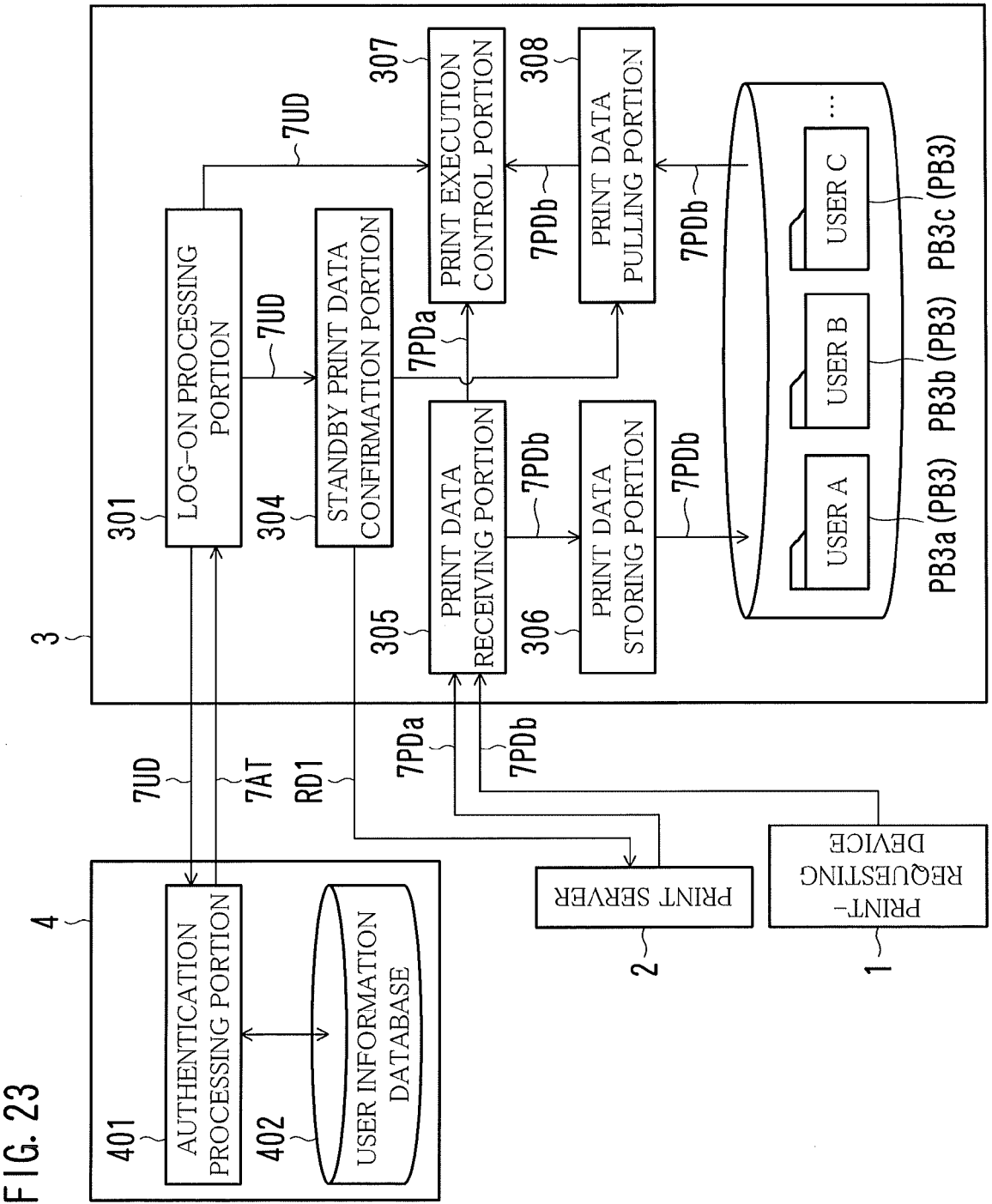
FIG. 23 is a diagram showing an example of a partial functional configuration of a printer and an authentication device.

FIG. 22 is a diagram showing an example of a printing system SYS2 according to the second embodiment, and FIG. 23 is a diagram showing an example of a partial functional configuration of a printer 3 and an authentication device 4.

Referring to FIG. 22, the printing system SYS2 has a configuration different from that of the printing system SYS1 shown in FIG. 2 of the first embodiment in that, in addition to the print-requesting device 1, the print server 2, and the printers 3 (3A-3C), the authentication device 4 is connected to a network NW.

The printing system SYS1 according to the first embodiment is so configured that the printer 3 performs processing for user authentication at a time when a user logs onto the printer 3. In contrast, the printing system SYS2 according to the second embodiment is so configured that the authentication device 4 performs processing for user authentication at a time when a user logs onto the printer 3.

The authentication device 4 is provided with a CPU, a RAM, a ROM, a non-volatile auxiliary storage device such as an HDD, and a network interface for sending and receiving data with other information processing devices via a network such as a LAN.

Referring to FIG. 23, the authentication device 4 is configured of control portions, e.g., an authentication processing portion 401 and a user information database 402. The ROM or the auxiliary storage device stores, therein, programs for implementing the functions of the control portions 401 and 402. The CPU executes the programs appropriately.

The authentication processing portion 401 and the user information database 402 correspond to the authentication processing portion 302 and the user information database 303, respectively, of the printer 3 according to the first embodiment.

Accordingly, the authentication processing portion 401 receives user data 7UD from the log-on processing portion 301 of the printer 3. The authentication processing portion 401, then, checks information indicated in the user data 7UD with information stored in the user information database 402, and performs processing for user authentication based on the check result. When the user is successfully authenticated, the authentication processing portion 401 provides the log-on processing portion 301 with an authentication ticket 7AT.

The other constituent elements of the devices in the second embodiment are the same as those in the first embodiment. Such constituent elements have been given the same reference signs as those in the first embodiment, and detailed descriptions thereof have been appropriately omitted.

The present invention enables printing in a secure manner even when a print server of a pull printing system is unavailable.

In the embodiments discussed above, the entire or partial configuration of the print-requesting device 1, the print server 2, and the printer 3, the content to be processed, the processing sequence, the data structure, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A printing system comprising:
   a terminal includes a processor for sending print data;
   a plurality of printers for performing printing based on the print data; and
   a transfer device includes a processor for transferring, in response to a request from any one of the printers, the print data to the a requesting printer;
   wherein:
   each of the plurality of printers is given a decryption key,
   each of the transfer device and the terminal has an encryption key table indicating encryption keys corresponding to the decryption keys of the plurality of printers,
   the terminal includes a processor that controls a first transmitter configured to encrypt a first password entered by a user to obtain a first encrypted password, and when communication with the transfer device is possible, associate the print data with the first encrypted password to send the associated print data and first encrypted password to the transfer device, and when the communication is impossible, request the user to select any one of the plurality of printers, encrypt the first password by using an encryption key corresponding to the selected printer from the encryption key table to obtain a second encrypted password, and send the print data in association with a command to perform authentication print and the second encrypted password to the selected printer without via the transfer device, the transfer device includes a processor that controls a second transmitter configured to decrypt the first encrypted password to obtain the first password, encrypt again the first password by using an encryption key corresponding to a printer as a request source of the plurality of printers, to obtain a third encrypted password, and to send the third encrypted password and the print data to the printer as the request source, and each of the plurality of the printer printers includes a processor that controls:

a requestor configured to, when user authentication of the user of the terminal is successful, request the print data from the transfer device, a decryptor configured to decrypt the second encrypted password or the third encrypted password to obtain the first password, and a printer configured to, if a second password entered by the user into the printer matches the first password obtained by decrypting the third encrypted password perform the printing based on the print data received from the transfer device, and configured to, if the second password matches the first password obtained by decrypting the second encrypted password, perform the printing based on the print data received from the terminal.

2. The printing system according to claim 1, wherein each of the printers controls an authentication device to perform the user authentication.

3. A printing method used in a printing system including a terminal for sending print data, a plurality of printers for performing printing based on the print data, and a transfer device for transferring, in response to a request from any one of the printers, the print data to a requesting printer, wherein each of the plurality of printers is given a decryption key, and each of the transfer device and the terminal has an encryption key table indicating encryption keys corresponding to the decryption keys of the plurality of printers, the printing method comprising:

encrypting, by the terminal, a first password entered by a user to obtain a first encrypted password, and when communication with the transfer device is possible, associating the print data with the first encrypted password and sending, by the terminal, the associated print data and first encrypted password to the transfer device, and when the communication is impossible, requesting the user to select any one of the plurality of printers, encrypting the first password by using an encryption key corresponding to the selected printer from the encryption key table to obtain a second encrypted password, and sending, by the terminal, the print data in association with a command to perform authentication print and the second encrypted password to the selected printer without via the transfer device;

decrypting, via the transfer device, the first encrypted password to obtain the first password, encrypting again the first password by using an encryption key corresponding to a printer as a request source of the plurality of printers, to obtain a third encrypted password, and sending the third encrypted password and the print data to the printer as the request source, requesting, by the printer, the print data from the transfer device when user authentication of the user of the terminal is successful;

a decrypting, by the printer, the second encrypted password or the third encrypted password to obtain the first password, and if a second password entered by the user into the printer matches the first password obtained by decrypting the third encrypted password, performing, by the printer, the printing based on the print data received from the transfer device, and if the second password matches the first password obtained by decrypting the second encrypted password, performing the printing based on the print data received from the terminal.

4. The printing method according to claim 3, wherein each of the printers controls an authentication device to perform the user authentication.

5. A terminal connectable to a plurality of printers for performing printing based on print data and to a transfer device which includes a processor for transferring, in response to a request from any one of the printers, the print to a requesting printer, wherein each of the plurality of printers is given a decryption key, the terminal comprising a processor that controls:

an encryptor configured to encrypt a password entered by a user by using an encryption key corresponding to one of the plurality of printers, and to generate an encrypted password;

a transmitter configured to encrypt a first password entered by a user to obtain a first encrypted password and to associate the print data with the first encrypted password, and when communication with the transfer device is possible, configured to send the associated print data and first encrypted password to the transfer device, and when the communication is impossible, request the user to select any one of the plurality of printers, encrypt the first password by using an encryption key corresponding to the selected printer to obtain a second encrypted password, and send the print data in association with a command to perform authentication print and the second encrypted password to the selected printer without via the transfer device; and the transfer device includes a processor that controls a second transmitter configured to decrypt the first encrypted password to obtain the first password, encrypt again the first password by using an encryption key corresponding to a printer as a request source of the plurality of printers, to obtain a third encrypted password, and to send the third encrypted password and the print data to the printer as the request source.

6. A non-transitory computer-readable storage medium storing thereon a computer program used in a computer connectable to a printer for performing printing based on print data and to a transfer device which includes a processor for transferring, in response to a request from any one of the printers, the print data requesting printer, wherein each of the plurality of printers is given a decryption key, the computer program causing the computer to implement processes comprising:

encryption processing for encrypting a password entered by a user by using an encryption key corresponding to one of the plurality of printers and to generate an encrypted password;

transmission processing for encrypting a first password entered by a user to obtain a first encrypted password and associating the print data with the first encrypted password, and when communication with the transfer device is possible, sending the associated print data and first encrypted password to the transfer device and when the communication is impossible, requesting the user to select any one of the plurality of printers, encrypting the first password by using an encryption key corresponding to the selected printer to obtain a second encrypted password, and sending the print data in association with a command to perform authentication print and the second encrypted password to the selected printer without via the transfer device; and the transfer device includes a processor that controls the transmission processing to decrypt the first encrypted password to obtain the first password, encrypt again the first password by using an encryption key corresponding to a printer as a request source of the plurality of printers, to obtain a third encrypted password, and to send the third encrypted password and the print data to the printer as the request source.

* * * * *